US011991126B2

(12) United States Patent
Sharma

(10) Patent No.: US 11,991,126 B2
(45) Date of Patent: *May 21, 2024

(54) SYSTEMS AND METHODS FOR AGGREGATING USER SESSIONS FOR INTERACTIVE TRANSACTIONS USING VIRTUAL ASSISTANTS

(71) Applicant: Paymentus Corporation, Charlotte, NC (US)

(72) Inventor: Dushyant Sharma, Waxhaw, NC (US)

(73) Assignee: PAYMENTUS CORPORATION, Charlotte, NC (US)

( * ) Notice: Subject to any disclaimer, the term of this patent is extended or adjusted under 35 U.S.C. 154(b) by 44 days.

This patent is subject to a terminal disclaimer.

(21) Appl. No.: 17/869,605

(22) Filed: Jul. 20, 2022

(65) Prior Publication Data
US 2022/0353213 A1 Nov. 3, 2022

Related U.S. Application Data

(63) Continuation of application No. 16/838,748, filed on Apr. 2, 2020, now Pat. No. 11,431,658.

(51) Int. Cl.
*H04L 51/02* (2022.01)
*G06F 3/16* (2006.01)
(Continued)

(52) U.S. Cl.
CPC ............... *H04L 51/02* (2013.01); *G06F 3/16* (2013.01); *G06F 9/453* (2018.02); *G06N 20/00* (2019.01);
(Continued)

(58) Field of Classification Search
CPC . G06F 3/16; G06F 3/167; G06F 9/451; G06F 9/453; G06F 16/2379;
(Continued)

(56) References Cited

U.S. PATENT DOCUMENTS 7,970,786 B2 6/2011 Bahrami et al.
8,954,317 B1 * 2/2015 Fisher ..................... G06F 40/10
705/347

(Continued)

OTHER PUBLICATIONS

U.S. Appl. No. 16/838,748, filed Apr. 2, 2020, 2021/0314282, Allowed.

*Primary Examiner* — Gerald Gauthier
(74) *Attorney, Agent, or Firm* — ALSTON & BIRD LLP

(57) ABSTRACT

Methods, apparatuses, and computer program products are described for aggregating user sessions for conversational exchanges using a virtual assistant. A user device can receive conversational inputs, convert the conversational inputs into textual strings, associate, based upon semantic analysis of different portions of the textual strings, a first network and a second network, and initiate, respectively, a first and second user session with a first response module of the first network and a second response module of the second network. The portions of textual strings can be transmitted to the first and second response modules via, respectively, the first and second user sessions. Once response fragments are received from the first and second response modules, the response fragments can be combined in a semantically suitable order to form a generated response.

18 Claims, 10 Drawing Sheets

(51) Int. Cl.
  *G06F 9/451* (2018.01)
  *G06N 20/00* (2019.01)
  *G10L 15/18* (2013.01)
  *G10L 15/26* (2006.01)
  *H04L 65/1069* (2022.01)

(52) U.S. Cl.
  CPC .......... *G10L 15/1815* (2013.01); *G10L 15/26* (2013.01); *H04L 65/1069* (2013.01)

(58) Field of Classification Search
  CPC ...... G06F 16/951; G06F 40/10; G06F 40/106; G06F 40/35; G06F 40/253; G06F 40/279; G16H 40/20; G06N 3/006; G06N 3/047; G06N 3/08; G06N 5/022; G06N 20/00; G06Q 10/107; G06Q 10/109; G06Q 20/10; G06Q 20/102; G06Q 20/108; G06Q 20/16; G06Q 20/389; G06Q 20/4014; G06Q 20/4016; G06Q 30/0281; G06Q 40/00; G06Q 20/12; G06Q 20/202; G06Q 20/325; G06Q 20/3274; G06Q 20/405; G06Q 30/0631; G06Q 40/03; G06Q 40/02; G06Q 40/06; G06Q 40/12; G06Q 50/18; G06V 20/70; G06V 20/20; G10L 13/027; G10L 15/1815; G10L 15/1822; G10L 15/26; H04L 9/008; H04L 51/02; H04L 51/04; H04L 51/066; H04L 51/42; H04L 65/1069; H04L 65/65; H04L 67/02; H04L 67/306; H04L 67/53; H04M 3/51; H04W 4/14
  See application file for complete search history.

(56) References Cited

U.S. PATENT DOCUMENTS

| | | | |
|---|---|---|---|
| 9,767,454 B1* | 9/2017 | Mohsenzadeh | G06Q 20/16 |
| 10,423,948 B1 | 9/2019 | Wilson et al. | |
| 10,565,634 B2* | 2/2020 | Talmor | G06F 40/106 |
| 10,573,312 B1 | 2/2020 | Thomson et al. | |
| 10,630,840 B1 | 4/2020 | Karp et al. | |
| 10,635,751 B1* | 4/2020 | Relangi | G06F 40/35 |
| 10,810,574 B1* | 10/2020 | Wilson | G06Q 20/389 |
| 10,832,008 B2* | 11/2020 | Banerjee | G06F 40/253 |
| 10,915,227 B1* | 2/2021 | Proud | G06F 9/451 |
| 10,916,251 B1* | 2/2021 | Brandt | H04M 3/51 |
| 11,080,701 B2* | 8/2021 | Scott | G06Q 20/40 |
| 11,120,806 B2 | 9/2021 | Elson et al. | |
| 11,144,895 B2* | 10/2021 | Brunner | H04W 4/14 |
| 11,170,372 B2* | 11/2021 | Ezequiel | G06Q 20/325 |
| 11,205,196 B1* | 12/2021 | Raviv | H04L 51/42 |
| 11,210,677 B2 | 12/2021 | Jones et al. | |
| 11,218,429 B2* | 1/2022 | Yun | G06F 40/279 |
| 11,240,181 B1 | 2/2022 | Nagaraja | G16H 40/20 |
| 11,431,658 B2* | 8/2022 | Sharma | H04L 65/65 |
| 11,444,893 B1* | 9/2022 | Kalluri | G06F 16/2379 |
| 11,468,432 B2* | 10/2022 | Malhotra | G06Q 20/3274 |
| 11,620,621 B2* | 4/2023 | Pollin | G06Q 20/12 |
| | | | 705/40 |
| 11,704,501 B2* | 7/2023 | Wu | G06V 20/70 |
| | | | 382/156 |
| 2006/0080243 A1* | 4/2006 | Kemper | G06Q 40/00 |
| | | | 705/40 |
| 2006/0085332 A1* | 4/2006 | Imrey | G06Q 50/18 |
| | | | 705/39 |
| 2006/0190249 A1 | 8/2006 | Kahn et al. | |
| 2007/0050191 A1* | 3/2007 | Weider | G06F 16/951 |
| | | | 704/E15.04 |
| 2007/0156576 A1* | 7/2007 | Imrey | G06Q 40/03 |
| | | | 705/38 |
| 2007/0156580 A1* | 7/2007 | Imrey | G06Q 20/10 |
| | | | 705/37 |
| 2008/0140398 A1 | 6/2008 | Shpigel | |
| 2009/0076957 A1* | 3/2009 | Bishop | G06Q 40/00 |
| | | | 705/40 |
| 2009/0271385 A1 | 10/2009 | Krishnamoorthy et al. | |
| 2011/0093387 A1* | 4/2011 | Fuerstenberg | G06Q 20/102 |
| | | | 705/40 |
| 2011/0178859 A1* | 7/2011 | Imrey | G06Q 20/405 |
| | | | 705/35 |
| 2011/0178860 A1* | 7/2011 | Imrey | G06Q 40/06 |
| | | | 705/35 |
| 2011/0178900 A1* | 7/2011 | Imrey | G06Q 20/102 |
| | | | 705/30 |
| 2011/0178901 A1* | 7/2011 | Imrey | G06Q 20/10 |
| | | | 705/30 |
| 2011/0178902 A1* | 7/2011 | Imrey | G06Q 40/12 |
| | | | 705/30 |
| 2011/0178934 A1* | 7/2011 | Imrey | G06Q 40/02 |
| | | | 706/47 |
| 2011/0224969 A1 | 9/2011 | Mulligan et al. | |
| 2012/0209833 A1 | 8/2012 | Kramer et al. | |
| 2013/0297590 A1 | 11/2013 | Zukovsky et al. | |
| 2013/0317984 A1* | 11/2013 | O'Leary | G06Q 20/10 |
| | | | 705/40 |
| 2014/0108583 A1 | 4/2014 | Kulkarni et al. | |
| 2014/0258091 A1 | 9/2014 | Jouhikainen et al. | |
| 2015/0149182 A1 | 5/2015 | Kains et al. | |
| 2015/0178822 A1* | 6/2015 | Babiarz | G06Q 30/0631 |
| | | | 705/26.7 |
| 2015/0332228 A1* | 11/2015 | Kimberg | G06Q 20/108 |
| | | | 705/40 |
| 2015/0363762 A1* | 12/2015 | Kimberg | G06Q 20/202 |
| | | | 705/40 |
| 2016/0109954 A1* | 4/2016 | Harris | G06V 20/20 |
| | | | 345/156 |
| 2016/0253639 A1* | 9/2016 | Sharma | G06Q 20/102 |
| | | | 705/40 |
| 2016/0267128 A1 | 9/2016 | Dumoulin et al. | |
| 2016/0267187 A1 | 9/2016 | Gabara | |
| 2017/0048170 A1* | 2/2017 | Smullen | H04L 67/02 |
| 2017/0242860 A1 | 8/2017 | Souche et al. | |
| 2017/0293610 A1* | 10/2017 | Tran | G06Q 10/109 |
| 2018/0137295 A1 | 5/2018 | Sharma | |
| 2018/0181997 A1* | 6/2018 | Sanjeevaiah Krishnaiah | |
| | | | H04L 67/53 |
| 2018/0212904 A1* | 7/2018 | Smullen | H04L 51/04 |
| 2018/0232376 A1 | 8/2018 | Zhu et al. | |
| 2018/0247648 A1 | 8/2018 | Nadimpalli et al. | |
| 2018/0278552 A1* | 9/2018 | Quock | G06Q 20/4016 |
| 2019/0130913 A1 | 5/2019 | Li | |
| 2019/0188218 A1* | 6/2019 | Harris | G06N 5/022 |
| 2019/0273701 A1* | 9/2019 | Basheer | H04L 51/02 |
| 2019/0297031 A1* | 9/2019 | Basheer | G06N 3/006 |
| 2019/0339784 A1 | 11/2019 | Lemay et al. | |
| 2019/0341031 A1 | 11/2019 | Cox et al. | |
| 2019/0372824 A1 | 12/2019 | Montero et al. | |
| 2019/0391827 A1* | 12/2019 | Simanovich | G06Q 30/0281 |
| 2020/0135209 A1 | 4/2020 | Delfarah et al. | |
| 2020/0159777 A1 | 5/2020 | Weldemariam et al. | |
| 2020/0175961 A1 | 6/2020 | Thomson et al. | |
| 2020/0227032 A1 | 7/2020 | Toplyn | |
| 2020/0374394 A1 | 11/2020 | Karp et al. | |
| 2021/0050010 A1 | 2/2021 | Lu et al. | |
| 2021/0065702 A1 | 3/2021 | Fink et al. | |
| 2021/0081947 A1* | 3/2021 | Hockey | G06Q 20/4014 |
| 2021/0089934 A1 | 3/2021 | Thornley et al. | |
| 2021/0105451 A1 | 4/2021 | Oyman et al. | |
| 2021/0117553 A1* | 4/2021 | Shpurov | H04L 9/008 |
| 2021/0119794 A1* | 4/2021 | Shpurov | G10L 15/1822 |
| 2021/0133705 A1* | 5/2021 | Iyer | G06Q 20/108 |
| 2021/0136129 A1 | 5/2021 | Ponnusamy et al. | |
| 2021/0136130 A1 | 5/2021 | Ponnusamy et al. | |
| 2021/0142798 A1 | 5/2021 | Pulicharia et al. | |
| 2021/0201380 A1* | 7/2021 | Belcher | G06Q 30/0631 |
| 2021/0234815 A1* | 7/2021 | Karp | H04L 67/306 |
| 2021/0249002 A1 | 8/2021 | Ahmadidaneshashtiani et al. | |
| 2021/0256345 A1 | 8/2021 | Mars et al. | |
| 2021/0304741 A1* | 9/2021 | Cavallari | G10L 15/26 |
| 2021/0314282 A1* | 10/2021 | Sharma | H04L 65/1069 |
| 2021/0342785 A1 | 11/2021 | Mann et al. | |

(56) References Cited

U.S. PATENT DOCUMENTS

| | | | |
|---|---|---|---|
| 2021/0374754 A1* | 12/2021 | Pandian | G06Q 20/4016 |
| 2021/0383810 A1 | 12/2021 | Camenares et al. | |
| 2021/0390268 A1 | 12/2021 | Pandey et al. | |
| 2022/0006761 A1* | 1/2022 | Magliozzi | G06Q 10/107 |
| 2022/0353213 A1* | 11/2022 | Sharma | H04L 65/1069 |
| 2023/0085061 A1* | 3/2023 | Ma | G06N 3/047 |
| | | | 706/25 |

* cited by examiner

SYSTEMS AND METHODS FOR AGGREGATING USER SESSIONS FOR INTERACTIVE TRANSACTIONS USING VIRTUAL ASSISTANTS

CROSS-REFERENCE TO RELATED APPLICATIONS

This application is a continuation of U.S. Non-Provisional patent application Ser. No. 16/838,748, filed Apr. 2, 2020 and entitled "Systems and Methods for Aggregating User Sessions for Interactive Transactions using Virtual Assistants," the entire disclosures of which are hereby incorporated herein by reference in their entireties for all purposes.

TECHNICAL FIELD

An example embodiment relates generally to electronic communication technology, particularly in the context of virtual assistants, conversational artificial intelligence, and/or chatbots.

BACKGROUND

Chatbots are interactive, conversational software that are configured to listen to a question from a user and communicate a response to the user. Chatbots are often used by companies on their websites to communicate with users based upon a set list of frequently asked questions and corresponding answers pulled from a static database of the same and/or sometimes based upon a user's account information or personally provided information. As such, conventional chatbots are limited to providing answers based upon the limited, static database provided. If, for instance, a user asks a question that is not addressed in the static database, the chatbot often must respond that no answer could be provided, provide a telephone number for the user to call a manned hotline, or escalate the question to a manned service desk that can communicate directly or indirectly with the user regarding their question in a manner outside the capabilities of the chatbot. Chatbots are often represented in a textual format, which reflects a design or style that is reminiscent of a SMS messaging format or the like. Chatbots may also be represented by an emoji or a virtual assistant that is reminiscent of a human or humanoid or the like. For instance, Microsoft® Office products have often featured an animated, digital paperclip that answers questions from a user based upon a static database of frequently asked questions. Likewise, many companies' websites feature a virtual assistant to answer questions about the company, products, services, and/or the like, however these virtual assistants are typically limited to a static database for generating answers to customer questions, and often operate based upon a simple Boolean search using key terms from the user's textual or verbal question. Even those chatbots that use artificial intelligence are not afforded information from outside the static database of questions and answers when generating a response to a user's questions.

Interactive voice response (IVR) systems are automated telephone systems that provide auditory prompts (e.g., words, tones, numbers, etc.) that the caller may select using their touch-tone phone or vocally. The IVR system can then interpret the caller input with regard to the prompts and route the call through the IVR system to a desired destination (e.g., an automated payment processing center, a manned call center, an automated account status message, or the like). IVR systems can sometimes respond to a caller's vocal questions or comments with a vocal response, by initiating a callback, sending an email, or the like. Some IVR systems include or are linked to a chatbot, such as discussed above, which is able to generate a response to a caller's question based upon a static database of questions and answers, and sometimes based upon a caller's account information.

Users, whether they are interacting with a chatbot or an IVR system, initiate a single user session through such interaction that relies on historical data from a static set of questions and answers, user provided information, a user's account details, and/or the like. When a user asks a question outside the bounds or capabilities of the chatbot or IVR system, the question is either not answered or escalated for human response, thus leaving the user without an answer to their question during the user session and requiring a prolonged and costly human interaction with the user, typically requiring that the user be re-authenticated, and increasing the possibility of an improperly terminated user session, among many other issues that arise from the increased complexity of conventional chatbots and IVR systems.

The inventor of the invention disclosed herein have identified these and other technical challenges and have developed the solutions described and otherwise disclosed herein.

SUMMARY

Methods, apparatuses, and computer program products are therefore provided in accordance with example embodiments to provide, for example, for aggregating user sessions for interactive transactions using virtual assistants, conversational artificial intelligence, and/or chatbots.

According to a first embodiment, a method is provided for aggregating user sessions for conversational exchanges using a virtual assistant. In some embodiments, the method can comprise initiating a first response module associated with a user session, said first response module being associated with a first network entity; initiating a second response module associated with said user session, said second response module being associated with a second network entity; receiving, at a user device, a plurality of utterances; converting said plurality of utterances into a plurality of textual strings; determining, for a first portion of said plurality of textual strings, to send a query to a first computer-implemented natural language processing system of the first network entity; determining, for a second portion of said plurality of textual strings, to send a query to a second computer-implemented natural language processing system of the second network entity; receiving, from said first network entity, a first portion of a generated response based upon said first portion of said plurality of textual strings; receiving, from said second network entity, a second portion of said generated response based upon said second portion of said plurality of textual strings; and combining said first and second portions of said generated response in a semantically suitable order to generate said generated response with regard to said plurality of utterances.

In some embodiments, the method can further comprise receiving, at said user device, a first triggering utterance, wherein the first triggering utterance includes a first command to contact said first network entity; and receiving, at said user device, a second triggering utterance, wherein the second triggering utterance includes a second command to contact said second network entity.

In some embodiments, the method can further comprise transmitting, to said user device, said generated response having said semantically suitable order with regard to said plurality of utterances.

According to a second embodiment, an apparatus is provided that comprises at least one processor and at least one memory including computer program instructions. In some embodiments, said at least one processor can be configured, with said at least one memory including computer program instructions, at least to initiate a first response module associated with a user session, said first response module being associated with a first network entity; initiate a second response module associated with said user session, said second response module being associated with a second network entity; receive, at a user device, a plurality of utterances; convert said plurality of utterances into a plurality of textual strings; determine, for a first portion of said plurality of textual strings, to send a query to a first computer-implemented natural language processing system of the first network entity; determine, for a second portion of said plurality of textual strings, to send a query to a second computer-implemented natural language processing system of the second network entity; receive, from said first network entity, a first portion of a generated response based upon said first portion of said plurality of textual strings; receive, from said second network entity, a second portion of said generated response based upon said second portion of said plurality of textual strings; and combine said first and second portions of said generated response in a semantically suitable order to generate said generated response with regard to said plurality of utterances.

In some embodiments, the at least one processor can be further configured, with said at least one memory including computer program instructions, at least to receive, at said user device, a first triggering utterance, wherein the first triggering utterance includes a first command to contact said first network entity; and receive, at said user device, a second triggering utterance, wherein the second triggering utterance includes a second command to contact said second network entity.

In some embodiments, the at least one processor can be configured, with said at least one memory including computer program instructions, at least to transmit, to said user device, said generated response having said semantically suitable order with regard to said plurality of utterances.

According to a third embodiment, at least one non-transitory computer readable medium is provided that comprises instructions that, when executed, cause a computing device to perform at least the following: initiate a first response module associated with a user session, said first response module being associated with a first network entity; initiate a second response module associated with said user session, said second response module being associated with a second network entity; receive, at a user device, a plurality of utterances; convert said plurality of utterances into a plurality of textual strings; determine, for a first portion of said plurality of textual strings, to send a query to a first computer-implemented natural language processing system of the first network entity; determine, for a second portion of said plurality of textual strings, to send a query to a second computer-implemented natural language processing system of the second network entity; receive, from said first network entity, a first portion of a generated response based upon said first portion of said plurality of textual strings; receive, from said second network entity, a second portion of said generated response based upon said second portion of said plurality of textual strings; and combine said first and second portions of said generated response in a semantically suitable order to generate said generated response with regard to said plurality of utterances.

In some embodiments, the at least one non-transitory computer readable medium of can further comprise instructions that, when executed, cause a computing device to perform at least the following: receive, at said user device, a first triggering utterance, wherein the first triggering utterance includes a first command to contact said first network entity; and receive, at said user device, a second triggering utterance, wherein the second triggering utterance includes a second command to contact said second network entity.

In some embodiments, the at least one non-transitory computer readable medium can further comprise instructions that, when executed, cause a computing device to perform at least the following: transmit, to said user device, said generated response having said semantically suitable order with regard to said plurality of utterances.

According to a fourth embodiment, a method is provided for aggregating user sessions for conversational exchanges using interactive voice response. In some embodiments, the method can comprise receiving, at a smart device, a first verbal instruction to initiate a first communication with a first telephone system, one or more utterances indicative of an intent of said first communication, one or more utterances indicative of user personally identifying information; and one or more utterances indicative of authentication indicia; initiating, for instance using voice-over-internet protocol (VoIP), said first communication with said first telephone system; causing said first telephone system to initiate a first interactive voice response protocol based upon at least one of said intent of said first communication, said user personally identifying information, and said authentication indicia; receiving, at said smart device, a second verbal instruction to initiate a second communication with a second telephone system, one or more utterances indicative of other user personally identifying information; and one or more utterances indicative of other authentication indicia; initiating, via said Voice over Internet Protocol, said second communication with said second telephone system; and causing said second telephone system to initiate a second interactive voice response protocol based upon at least one of said intent of said second communication, said other user personally identifying information, and said other authentication indicia.

According to a fifth embodiment, an apparatus is provided that comprises at least one processor and at least one memory including computer program instructions. In some embodiments, said at least one processor can be configured, with said at least one memory including computer program instructions, at least to: receive, at a smart device, a first verbal instruction to initiate a first communication with a first telephone system, one or more utterances indicative of an intent of said first communication, one or more utterances indicative of user personally identifying information; and one or more utterances indicative of authentication indicia; initiate, for instance using voice-over-internet protocol (VoIP), said first communication with said first telephone system; cause said first telephone system to initiate a first interactive voice response protocol based upon at least one of said intent of said first communication, said user personally identifying information, and said authentication indicia; receive, at said smart device, a second verbal instruction to initiate a second communication with a second telephone system, one or more utterances indicative of other user personally identifying information; and one or more utterances indicative of other authentication indicia; initiate, via said Voice over Internet Protocol, said second communication with said second telephone system; and cause said second telephone system to initiate a second interactive voice response protocol based upon at least one of said intent of said second communication, said other user personally identifying information, and said other authentication indicia.

According to a sixth embodiment, at least one non-transitory computer readable medium is provided that comprises instructions that, when executed, cause a computing device to perform at least the following: receive, at a smart device, a first verbal instruction to initiate a first communication with a first telephone system, one or more utterances indicative of an intent of said first communication, one or more utterances indicative of user personally identifying information; and one or more utterances indicative of authentication indicia; initiate, for instance using voice-over-internet protocol (VoIP), said first communication with said first telephone system; cause said first telephone system to initiate a first interactive voice response protocol based upon at least one of said intent of said first communication, said user personally identifying information, and said authentication indicia; receive, at said smart device, a second verbal instruction to initiate a second communication with a second telephone system, one or more utterances indicative of other user personally identifying information; and one or more utterances indicative of other authentication indicia; initiate, via said Voice over Internet Protocol, said second communication with said second telephone system; and cause said second telephone system to initiate a second interactive voice response protocol based upon at least one of said intent of said second communication, said other user personally identifying information, and said other authentication indicia.

According to a seventh embodiment, a method can be provided for aggregating user sessions for conversational exchanges using a virtual assistant, the method comprising: receiving, at a user device, a plurality of conversational inputs; converting the plurality of conversational inputs into a plurality of textual strings; associating, based upon semantic analysis of a first portion of said plurality of textual strings, a first network; associating, based upon semantic analysis of a second portion of said plurality of conversational inputs, a second network; initiating a first user session with a first response module of the first network; initiating a second user session with a second response module of the second network; sending the first portion of the plurality of textual strings, within the first user session, to the first response module of the first network; sending the second portion of the plurality of textual strings, within the second user session, to the second response module of the second network; receiving, from the first response module of said first network, a response fragment comprising a response to said first portion of said plurality of textual strings; receiving, from the second response module of said second network, a second response fragment comprising a response to said second portion of said plurality of textual strings; and combining the first and second response fragments in a semantically suitable order to form a generated response.

In some embodiments, said combining the first and second response fragments in a semantically suitable order can comprise combining the first and second response fragments by subject matter, by associated network, by chronology, or by determined relative urgency of the respective response fragment. In some embodiments, the first and second response fragments comprise textual information. In some embodiments, the method can further comprise converting the first and second response fragments into a plurality of conversational outputs; and causing auditory presentation of the generated response by the user device. In some embodiments, the method can further comprise determining, from one or more of the plurality of textual strings, to initiate the first user session with the first response module of the first network and/or to initiate the second user session with the second response module of the second network. In some embodiments, the first response module and/or the second response module comprises a chatbot and the first network and/or the second network comprises a server operated by one or more providers. In some embodiments, the method can further comprise determining, from one or more of the plurality of textual strings, an intent of one or more conversational inputs from the plurality of conversation inputs, one or more pieces of personally identifying information, and/or one or more authentication indicia. In some embodiments, said first response module and/or said second response module can comprise a chatbot and the first network and/or the second network comprises one or more interactive voice response (IVR) systems operated by one or more providers. In some embodiments, the method can further comprise initiating, based upon at least the intent, the one or more pieces of personally identifying information, and/or the one or more authentication indicia, a first IVR protocol comprising: providing, in the first user session, for communication between the user and the first response module; and determining, based at least upon the intent of said one or more of the plurality of textual strings, to establish the second user session for communication between the user and the second response module. In some embodiments, the method can further comprise determining, based on semantic analysis of a third portion of said plurality of textual strings, to: disconnect one or more of the first user session and the second user session; and, after a predetermined time, establish one or more other user sessions between a mobile device of the user and one or more of the first response module and the second response module.

According to an eighth embodiment, a non-transitory computer readable medium can be provided that comprises instructions that, when executed, cause a computing device to perform at least the following: receive, at a user device, a plurality of conversational inputs; convert the plurality of conversational inputs into a plurality of textual strings; associate, based upon semantic analysis of a first portion of said plurality of textual strings, a first network; associate, based upon semantic analysis of a second portion of said plurality of conversational inputs, a second network; initiate a first user session with a first response module of the first network; initiate a second user session with a second response module of the second network; send the first portion of the plurality of textual strings, within the first user session, to the first response module of the first network; send the second portion of the plurality of textual strings, within the second user session, to the second response module of the second network; receive, from the first response module of said first network, a response fragment comprising a response to said first portion of said plurality of textual strings; receive, from the second response module of said second network, a second response fragment comprising a response to said second portion of said plurality of textual strings; and combine the first and second response fragments in a semantically suitable order to form a generated response.

In some embodiments, said combining the first and second response fragments in a semantically suitable order can comprise combining the first and second response fragments by subject matter, by associated network, by chronology, or by determined relative urgency of the respective response fragment. In some embodiments, the first and second response fragments comprise textual information. In some embodiments, the non-transitory computer readable medium can further comprise instructions that, when executed, cause the computing device to perform at least the following: convert the first and second response fragments into a plurality of conversational outputs; and cause auditory presentation of the generated response by the user device. In some embodiments, the non-transitory computer readable medium can further comprise instructions that, when executed, cause the computing device to perform at least the following: determine, from one or more of the plurality of textual strings, to initiate the first user session with the first response module of the first network and/or to initiate the second user session with the second response module of the second network. In some embodiments, the non-transitory computer readable medium can further comprise instructions that, when executed, cause the computing device to perform at least the following: determine, from one or more of the plurality of textual strings, an intent of one or more conversational inputs from the plurality of conversation inputs, one or more pieces of personally identifying information, and/or one or more authentication indicia. In some embodiments, the first response module and/or the second response module comprises a chatbot and the first network and/or the second network comprises one or more servers operated or one or more interactive voice response (IVR) systems operated by one or more providers. In some embodiments, the non-transitory computer readable medium can further comprise instructions that, when executed, cause the computing device to perform at least the following: initiate, based upon at least the intent, the one or more pieces of personally identifying information, and/or the one or more authentication indicia, a first IVR protocol comprising: providing, in the first user session, for communication between the user and the first response module; and determining, based at least upon the intent of said one or more of the plurality of textual strings, to establish the second user session for communication between the user and the second response module. In some embodiments, the non-transitory computer readable medium can further comprise instructions that, when executed, cause the computing device to perform at least the following: determine, based on semantic analysis of a third portion of said plurality of textual strings, to: disconnect one or more of the first user session and the second user session; and, after a predetermined time, establish one or more other user sessions between a mobile device of the user and one or more of the first response module and the second response module.

According to a ninth embodiment, an apparatus can be provided that comprises one or more processors and one or more memory devices storing computer instructions, the one or more memory devices storing computer program code being configured to, with the one or more processors, at least the following: receive, at a user device, a plurality of conversational inputs; convert the plurality of conversational inputs into a plurality of textual strings; associate, based upon semantic analysis of a first portion of said plurality of textual strings, a first network; associate, based upon semantic analysis of a second portion of said plurality of conversational inputs, a second network; initiate a first user session with a first response module of the first network; initiate a second user session with a second response module of the second network; send the first portion of the plurality of textual strings, within the first user session, to the first response module of the first network; send the second portion of the plurality of textual strings, within the second user session, to the second response module of the second network; receive, from the first response module of said first network, a response fragment comprising a response to said first portion of said plurality of textual strings; receive, from the second response module of said second network, a second response fragment comprising a response to said second portion of said plurality of textual strings; and combine the first and second response fragments in a semantically suitable order to form a generated response.

In some embodiments, said combining the first and second response fragments in a semantically suitable order can comprise combining the first and second response fragments by subject matter, by associated network, by chronology, or by determined relative urgency of the respective response fragment. In some embodiments, the first and second response fragments comprise textual information. In some embodiments, the one or more memory devices storing computer program code can be further configured to, with the one or more apparatuses, cause the apparatus to at least: convert the first and second response fragments into a plurality of conversational outputs; and cause auditory presentation of the generated response by the user device. In some embodiments, the one or more memory devices storing computer program code can be further configured to, with the one or more apparatuses, cause the apparatus to at least: determine, from one or more of the plurality of textual strings, to initiate the first user session with the first response module of the first network and/or to initiate the second user session with the second response module of the second network. In some embodiments, the one or more memory devices storing computer program code can be further configured to, with the one or more apparatuses, cause the apparatus to at least: determine, from one or more of the plurality of textual strings, an intent of one or more conversational inputs from the plurality of conversation inputs, one or more pieces of personally identifying information, and/or one or more authentication indicia. In some embodiments, the first response module and/or the second response module comprises a chatbot and the first network and/or the second network comprises one or more servers operated or one or more interactive voice response (IVR) systems operated by one or more providers. In some embodiments, the one or more memory devices storing computer program code can be further configured to, with the one or more apparatuses, cause the apparatus to at least: initiate, based upon at least the intent, the one or more pieces of personally identifying information, and/or the one or more authentication indicia, a first IVR protocol comprising: providing, in the first user session, for communication between the user and the first response module; and determining, based at least upon the intent of said one or more of the plurality of textual strings, to establish the second user session for communication between the user and the second response module. In some embodiments, the one or more memory devices storing computer program code can be further configured to, with the one or more apparatuses, cause the apparatus to at least: determine, based on semantic analysis of a third portion of said plurality of textual strings, to: disconnect one or more of the first user session and the second user session; and, after a predetermined time, establish one or more other user sessions between a mobile device of the user and one or more of the first response module and the second response module.

According to a tenth embodiment, a method is provided for providing information to a user from multiple providers and/or regarding multiple accounts. In some embodiments, the method can comprise: establishing communication with a plurality of information sources, the plurality of information sources being associated with a user; receiving information from a first information source indicative of a first account or a first provider; receiving additional information from a second information source indicative of a second account or a second provider; storing the information and additional information in a database or index associated with the user; receiving a request for information associated with the first account or the first provider; receiving another request for information associated with the second account or the second provider; preparing a first response portion based upon the information from the first information source; preparing a second response portion based upon the additional information from the second information source; and combining the first and second response portions in a semantically suitable order to form a compiled response.

According to an eleventh embodiment, a non-transitory computer readable medium can be provided that comprises instructions that, when executed, cause a computing device to provide information to a user device from multiple providers and/or regarding multiple accounts. In some embodiments, the non-transitory computer readable medium can comprise instructions that, when executed, cause a computing device to at least: establish communications with a plurality of information sources, the plurality of information sources being associated with a user; receive information from a first information source indicative of a first account or a first provider; receive additional information from a second information source indicative of a second account or a second provider; store the information and additional information in a database or index associated with the user; receive a request for information associated with the first account or the first provider; receive another request for information associated with the second account or the second provider; prepare a first response portion based upon the information from the first information source; prepare a second response portion based upon the additional information from the second information source; and combine the first and second response portions in a semantically suitable order to form a compiled response.

According to a twelfth embodiment, an apparatus can be provided for providing information to a user device from multiple providers and/or regarding multiple accounts. In some embodiments, the apparatus can comprise one or more processors and one or more memory devices storing computer instructions, the one or more memory devices storing computer program code being configured to, with the one or more processors, at least the following: establish communications with a plurality of information sources, the plurality of information sources being associated with a user; receive information from a first information source indicative of a first account or a first provider; receive additional information from a second information source indicative of a second account or a second provider; store the information and additional information in a database or index associated with the user; receive a request for information associated with the first account or the first provider; receive another request for information associated with the second account or the second provider; prepare a first response portion based upon the information from the first information source; prepare a second response portion based upon the additional information from the second information source; and combine the first and second response portions in a semantically suitable order to form a compiled response.

DETAILED DESCRIPTION

Figure 1:
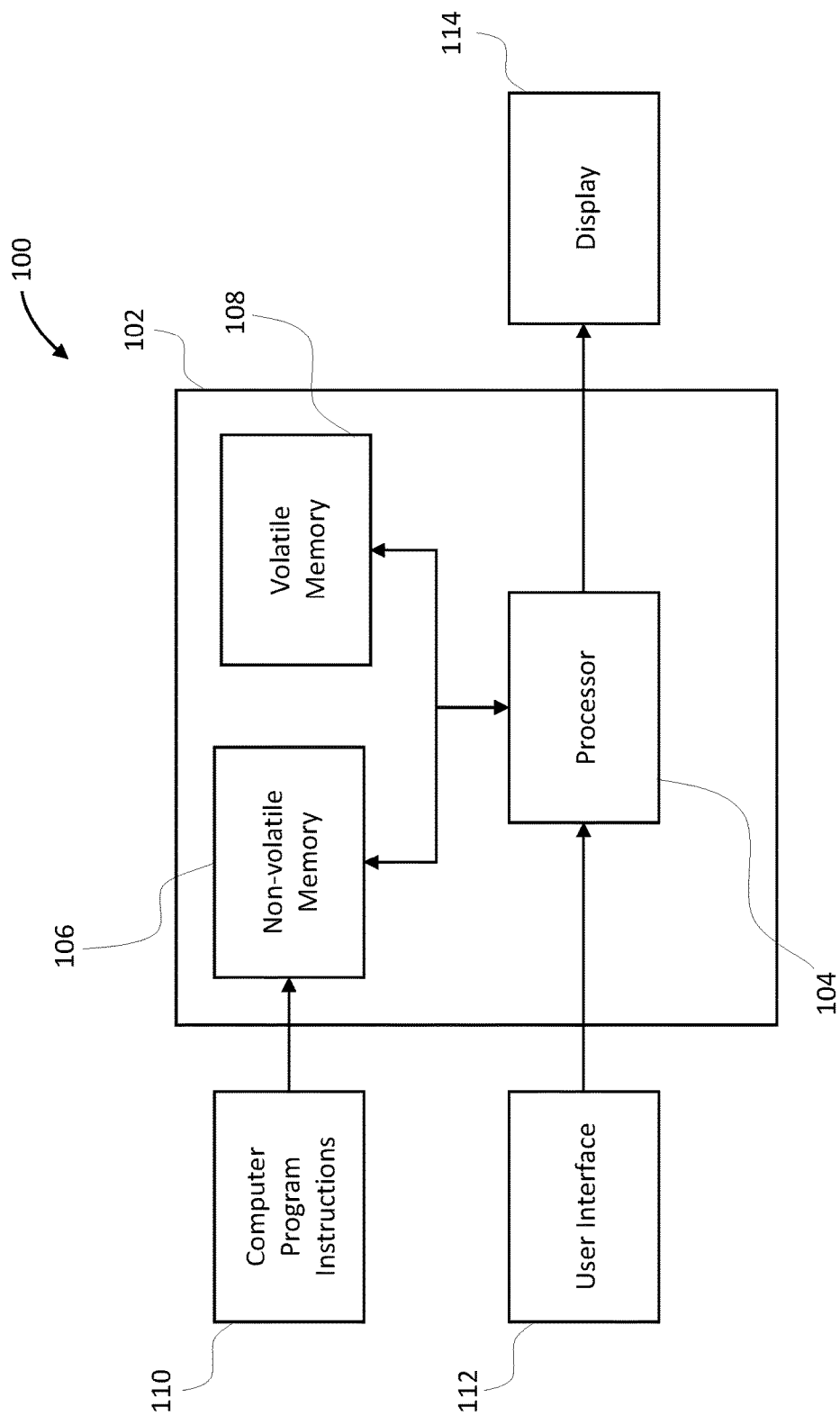
FIG. 1 is an apparatus diagram illustrating a computing device for carrying out one or more aspects of the currently disclosed invention.

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

Embodiments described herein relate generally to systems, methods, apparatuses, and computer program products for aggregating user sessions for interactive transactions using virtual assistants, conversational artificial intelligence, chatbots, and/or the like.

Referring now to FIG. 1, an apparatus 100 is illustrated for communicating with a user, initiating a user session with an API and/or another network entity, coordinating generation of a response to a user's question or comment, such as a series of responses formulated for an on-going, dynamic conversation. The apparatus 100 can comprise a computing device 102 that includes at least a processor 104 and one or both of a non-volatile memory 106 and a volatile memory 108. In some embodiments, the computing device 102 can be configured such that the processor 104 can be operably coupled to or otherwise in communication with one or both of the non-volatile memory 106 and the volatile memory 108. In some embodiments, the computing device 102 can comprise a laptop computer, a desktop computer, a cloud computing device, a server, a network, a hand-held computer, a mobile computing device, a mobile phone, a personal digital assistant, a tablet computer, any combination thereof, or the like.

In some embodiments, the processor 104 may comprise any electronic circuit configured to perform operations on a memory, such as the non-volatile memory 106 or volatile memory 108 or the like. In some embodiments, the processor 104 can comprise a central processing unit, a graphics processing unit, a vision processing unit, a tensor processing unit, a neural processing unit, a digital signal processor, an image signal processor, a synergistic processing element, a field-programmable gate array, a sound chip, or the like. In some embodiments, the processor 104 can comprise an arithmetic logic unit (not shown), a control unit (not shown), a speed clock (not shown), and the like. In some embodiments, the processor 104 can comprise one or more processing chips, microcontrollers, integrated chips, sockets, systems on a chip (SoC), array processor, vector processor, peripheral processing components, and the like.

In some embodiments, the non-volatile memory 106 can comprise any computer memory or memory device that can retain stored information even when not powered, such a read-only memory (ROM), flash memory, magnetic computer storage devices such as hard disks, floppy discs, magnetic tape, optical discs, FeRAM, CBRAM, PRAM, SONOS, RRAM, Racetrack memory, NRAM, Millipede, combinations thereof, and the like.

In some embodiments, the volatile memory 108 can comprise any computer memory or memory device that requires power to maintain the stored information, such as static random access memory (RAM), dynamic RAM, Z-RAM, TTRAM, A-RAM, ETA RAM, any combination thereof, or the like.

In some embodiments, the processor 104 or another such component of the computing device 102 can be configured to carry out a process or method based on computer program instructions 110. In some embodiments, the computer program instructions 110 can be stored on one of the non-volatile memory 106 and the volatile memory 108. In some embodiments, the computer program instructions 110 can be operable to cause the processor 104 to carry out any of the methods, approaches, processes, or the like disclosed herein. In some embodiments, the computer program code 110 can comprise computer-readable instructions, computer code, a coded application, and/or the like.

In the apparatus 100, the processor 104 (and/or co-processors or any other circuitry assisting or otherwise associated with the processor 104) may be in communication with the memory 106 or 108 via a bus for passing information among components of the apparatus 100. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor 104). The memory device may be configured to store information, data, content, applications, instructions, or the like for enabling the apparatus to carry out various functions in accordance with an example embodiment of the present disclosure. For example, the memory device could be configured to buffer input data for processing by the processor 104. Additionally or alternatively, the memory device could be configured to store instructions for execution by the processor 104, such as storing a warning message to be executed by the processor 104 and displayed on the user interface.

The apparatus 100 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein.

The processor 104 may be embodied in a number of different ways. For example, the processor 104 may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 104 may include one or more processing cores configured to perform independently. A multi-core processor 104 may enable multiprocessing within a single physical package. Additionally or alternatively, the processor 104 may include one or more processors 104 configured in tandem via the bus to enable independent execution of instructions, pipelining and/or multithreading.

In an example embodiment, the processor 104 may be configured to execute instructions stored in the memory 106 or 108 or otherwise accessible to the processor 104. Alternatively or additionally, the processor 104 may be configured to execute hard coded functionality. As such, whether configured by hardware or software methods, or by a combination thereof, the processor 104 may represent an entity (e.g., physically embodied in circuitry) capable of performing operations according to an embodiment of the present disclosure while configured accordingly. Thus, for example, when the processor 104 is embodied as an ASIC, FPGA or the like, the processor 104 may be specifically configured hardware for conducting the operations described herein. Alternatively, as another example, when the processor 104 is embodied as an executor of instructions, the instructions may specifically configure the processor 104 to perform the algorithms and/or operations described herein when the instructions are executed. However, in some cases, the processor 104 may be a processor 104 of a specific device (e.g., an encoder and/or a decoder) configured to employ an embodiment of the present disclosure by further configuration of the processor 104 by instructions for performing the algorithms and/or operations described herein. The processor 104 may include, among other things, a clock, an arithmetic logic unit (ALU) and logic gates configured to support operation of the processor 104.

In some embodiments, the apparatus 100 can further include a communication interface. In some embodiments, the communication interface may be any means such as a device or circuitry embodied in either hardware or a combination of hardware and software that is configured to receive and/or transmit data from/to a network and/or any other device or module in communication with the apparatus 100, such as an wireless local area network (WLAN), core network, a database or other storage device, etc. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, the apparatus 100 can further comprise a user interface 112 configured such that a user or viewer can input data, information, requests, commands, or the like to the computing device 102 via any suitable input approach. For instance, in some embodiments, the user or viewer may input a command or other suitable inputs verbally, textually, via a signal such as an optical signal or electrical signal, digitally via any suitable computer language, visually, a combination of these, or the like. As such, the user interface 112 can comprise any of a variety of input devices suitable to capture a user's or viewer's input. Some but not all of the suitable input devices are a video camera, a microphone, a digital pointing device such as a mouse or touchpad, an interactive touchscreen, a virtual reality environment, an augmented reality environment, one or more sensors configured to sense a gesture made by the user or viewer, combinations thereof, or the like.

In some embodiments, the processor 104 can be operably coupled to or otherwise in communication with the user interface 112 such that a user or viewer can input data, information, requests, commands, or the like to the computing device 102 via any suitable input approach. By way of example only, in some embodiments, the user interface 112 can comprise a video camera configured to capture video of a user or view, a microphone configured to capture audio from a user or viewer, and an audio/video processing unit configured to interpret gestures, audio, or other types of inputs from the user or viewer and interpret the input as a command, question, data input, or the like.

In some embodiments, the apparatus 100 can further comprise a display 114 configured to present media content to a user or viewer. In some embodiments, the display 114 can be operably coupled to or otherwise in communication with the processor 104 or another such component of the computing device 102. In some embodiments, the display 114 can be coupled to or integrated into the same hardware device as the user interface 112 such that the same user or viewer may transmit inputs to the computing device 102 while the computing device 102 can transmit media content to the display 114 to present or cause the display 114 to present the media content to the user or viewer. By way of example only, such an integrated hardware device that comprises the user interface 112 and the display 114 could be an interactive display or monitor, a computer screen, a touch-sensitive display, a head-mounted display, a display with an integrated video camera and/or microphone, a display with an integrated sensor, or a display configured to otherwise capture input information (e.g., commands, data, questions, comments, and the like) from the user or viewer.

In some embodiments, the apparatus 100 can be either a server-side device or a user device. In some embodiments, the apparatus 100 or a component thereof can be configured to be in wired or wireless communication with a network, a server, telecommunications equipment, a user device, another computing device, another processor, another memory device, and/or a mobile device such as a mobile phone or tablet.

Figure 2:
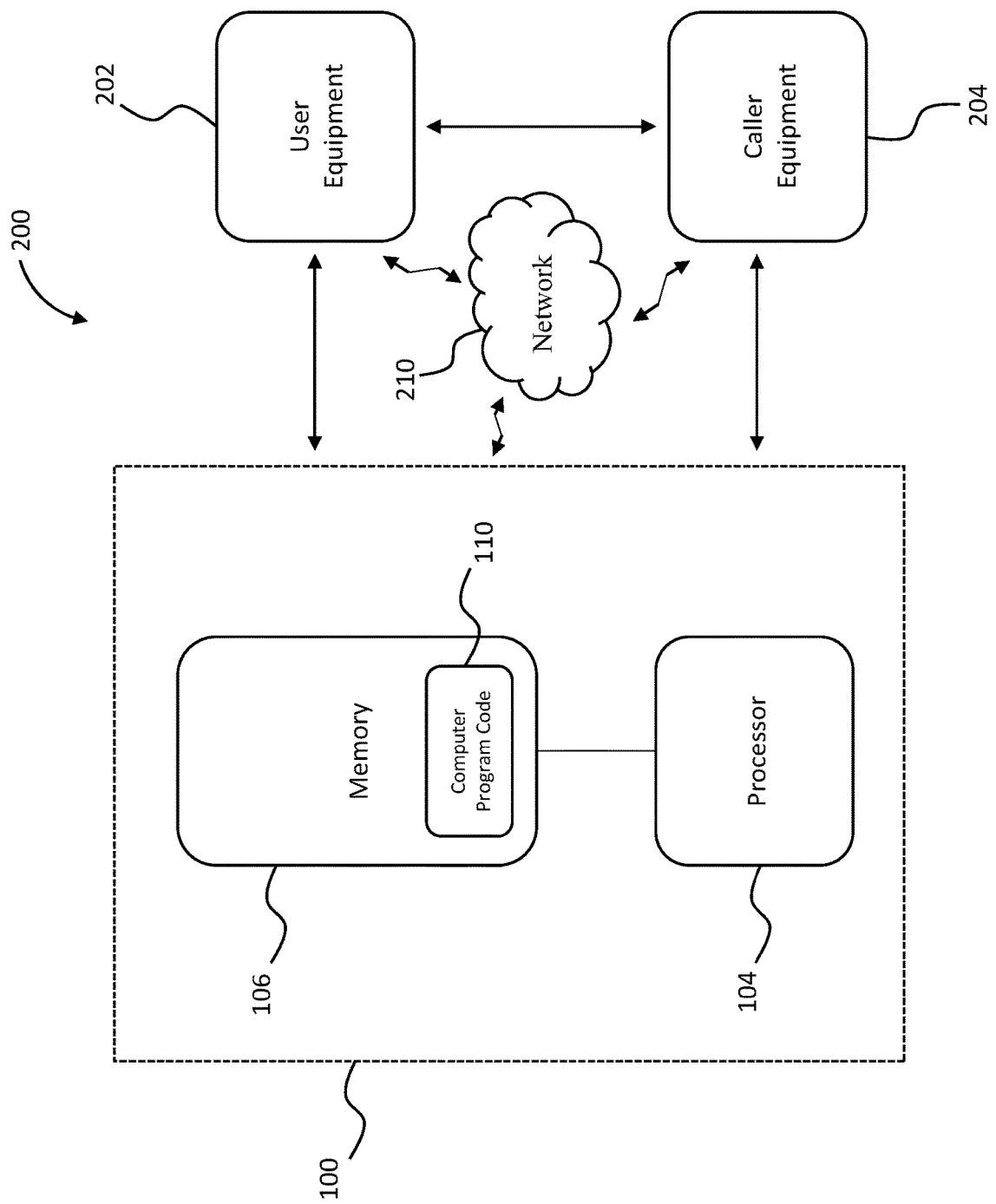
FIG. 2 is a distributed cloud server diagram illustrating a system for carrying out one or more aspects of the currently disclosed invention.

In some embodiments, such as illustrated in FIG. 2, the apparatus 100 or a component thereof can be a part of a system 200 and in communication with a user equipment 202, a caller equipment 204, and/or a network 210. In some embodiments, the system 200 or a component thereof, e.g., the network 210, can be stored, hosted, accessible via, or transmitted through a cloud computing environment, server, and/or the like. In some embodiments, the user equipment 202 can be a user's computer, such as a laptop or desktop computer, a mobile phone, a PDA, or the like. In some embodiments, the caller equipment 204 can be any suitable equipment, devices, or systems operated by or on behalf of a payee rendering the interactive bill for the payor (user or viewer of the apparatus 100). In some embodiments, the caller equipment 204 can comprise a telephone, such as a mobile phone, and/or a computing device such as described above with regard to apparatus 100, such as a computing device carrying out voice-over-internet protocol (VoIP) communications. In some embodiments, a caller equipment 204 can comprise a smart device, such as a virtual assistant operated by, stored on, and/or accessed by a smart speaker and/or another suitable playback or communications device. In some embodiments, a smart speaker can be configured to be in constant listening mode or in a sleep mode with low-power, non-recorded listening in the background such that a trigger word or a waking word can be used to awaken the smart speaker. In some embodiments, when the smart speaker hears a wake word, the smart speaker can switch to an active listening mode. In the active listening mode, a user may make a comment or ask a question, which the smart speaker may capture via any suitable microphone or sensor and convert the sound into text, which can be used to carry out a search based upon keywords or terms, for instance.

In some embodiments, some aspects or components of the system 200 can be similar to or the same as corresponding aspects or components of the apparatus 100 and are therefore not described in further detail here. It is noted, however, that any of the previously described circuitry, components, communications devices, processors, memories, and the like, can be the same or similar to those described above with respect to the apparatus 100.

In some embodiments, the system 200 can comprise a chatbot, such as discussed above, stored at the apparatus 100 and/or the network 210. In some embodiments, a chatbot may be configured to listen to ambient audio around the computing device on which the chatbot is stored. In some embodiments, the computing device, configured to store and operate the chatbot, further comprises a sensor or a microphone. In some embodiments, the sensor or microphone can be configured to operate in two or more states, such as a sleep mode, a low-power mode, a passive listening mode, an active listening mode, and/or the like. In some embodiments, the sensor or microphone can be configured to operate normally in sleep mode or another suitable mode in which the sensor or microphone listens for a wake word or another suitable trigger word which can cause the sensor or microphone to transition from sleep mode to active listening mode or another suitable mode. In some embodiments, in sleep mode, the microphone may sense all local ambient sound, transfer the local ambient sound to a processor which is configured to determine whether the ambient sound includes the trigger word. In some embodiments, the processor may convert the ambient sound to text and then parse the text into words and conduct a search for the trigger word. In some embodiments, such a search by the processor can include the use of natural language processing, or the like. In some embodiments, when the processor determines that a trigger word has not been spoken, the segment of ambient audio sensed by the sensor or microphone can be discarded. In some embodiments, when the processor determines that a trigger word has been spoken, the processor can cause the microphone to operate in active listening mode and can initiate the chatbot or the like to determine the intent of a question or command based upon a parsing of spoken words from the audio for a period of time following detecting of the trigger word.

Natural language processing (NLP) is a field of computer science, artificial intelligence, and linguistics concerned with the interactions between computers and human (natural) languages. Natural language processing includes natural language understanding (NLU) and natural language generation (NLG). NLU deals with machine reading comprehension, enabling computers to derive meaning from input containing natural language. NLG deals with the conversion of a computer-based representation of information into natural language, enabling computers to generate natural language from a machine representation system. Effectively, NLU and NLG are opposite processes, with NLU translating natural language into meaning in the machine representation system, and with NLG translating meaning in the machine representation system into natural language.

Devices that utilize speech processing may provide unique NLU responses that are personalized for a particular user or users. In particular, when natural language understanding (also referred to as NLU processing) is performed to resolve the meaning of a user's utterance, a personalized lexicon specific to the user and knowledge relating specifically to the device being spoken to may be used to resolve ambiguity and interpret meaning.

In some embodiments, when a processor initiates a chatbot, the processor can also initiate a user session, which is a log entry for a particular interaction with a user via a particular device (e.g., cell phone, smart speaker, or the like). In some embodiments, the user session can comprise all conversational elements from a time that the processor determines a user has spoken a trigger word until such a time that the user discontinues the conversation, or the processor determines that the user has discontinued the conversation, such as based upon a threshold period of time of silence or a user's unresponsiveness to a particular prompt or conversational element from the processor (e.g., via a speaker or the like).

In some embodiments, a processor can be configured to initiate a chatbot software program that is stored on a local memory device and/or a remote memory device. In some embodiments, a local smart device may comprise a microphone, a sensor, and/or a processor, such as a processor configured only to relay sensed audio from the microphone or sensor to a remote processor that is configured to determine if a trigger word has been spoken by a user.

In some embodiments, a smart speaker or similar device can be configured to initiate more than one chatbot, such as a first chatbot associated with a first ongoing user session and a second chatbot associated with a second ongoing user session. In some embodiments, a single user session can be initiated, and the smart device (e.g., local or remote processor) may initiate more than one chatbot associated with the single user session. In some embodiments, a single user session during which the smart device initiates or causes initiation of more than one chatbot may be used to combine chatbots that are, for instance, only associated with a single third party or network entity. In other embodiments, a smart device may initiate during a single user session a first chatbot associated with a first business or organization, a second chatbot associated with a second business or organization, and so on. In some embodiments, a smart device may initiate during a single user session a first chatbot associated with a first user and a second chatbot associated with a second user. For instance, in some embodiments, voice print identification or the like may be used to differentiate between multiple users making different requests and may initiate a single user session that calls up multiple chatbots to handle the different user conversations. In some embodiments, the smart device may initiate during a single use session multiple chatbots associated with multiple respective accounts of the user at a single business or organization. In some embodiments, any combination of different network entities, business or other organizations, users, user accounts, or the like may be represented by various chatbots during a single use session such that a smart speaker or processor (e.g., local processor or remote processor) may call upon a collective of specialized, otherwise siloed chatbots that can answer an array of questions and respond to these questions during a single user session.

For example, a user may activate a smart device using a trigger word and then ask about an account balance at a first bank, in response to which the smart device may call upon the chatbot associated with the first bank by sending a connection request to a network entity associated with the first bank. In some embodiments, the first bank may have a pre-established relationship with the smart device of the user such that the connection request is recognized by the network entity of the first bank as being associated with said user. In such an instance, the network entity of the first bank may initiate a chatbot associated with the first bank and establish a connection directly between the smart device and the chatbot of the first bank. In such an instance, the smart device may then act like a relay between the chatbot of the first bank and the user. For instance, the smart device may simply relay audio captured by the sensor or microphone of the smart device to the chatbot associated with the first bank. On the other hand, the smart device may comprise a processor that is configured to convert audio to text such that the smart device may simply relay a parsed textual transcript or partial transcript of the user's side of the conversation to the chatbot. The chatbot can then interpret the question or comment from the user for intent and generate a suitable textual response based upon the information provided in an account file associated with the user's account at the first bank and based upon a database of relevant and general information, such as questions and possible associated answers. Once the textual response to the user's comment or question is generated by the chatbot, the chatbot can transmit the textual response to the smart device, which can generate a natural language audio format based upon the textual response, or the chatbot can generate the natural language audio format directly from the textual format and can relay the natural language audio format to the smart device. The smart device can then cause a speaker or the like to transmit the generated natural language audio format response to the user.

During the same user session and/or at the same time that the smart device is establishing a connection with the chatbot of the first bank, the smart device may also, for instance, in response to a user requesting a balance of a second account associated with a second bank, call upon a chatbot associated with the second bank by sending a connection request to a network entity associated with the second bank. During the same user session, meaning during the same conversation, a user may query the smart device about two different account balances for two different accounts at two different banks and the smart device or a processor thereof may initiate separate chatbots to contribute generated responses in a coherent conversational manner to the user.

In some embodiments, a chatbot may carry out a response module, such as a computer program, to query a database associated with the particular network entity, business, organization, or the like. In some embodiments, the response module can comprise an artificial intelligence program, such as a neural network or the like. In some embodiments, a response module may be dynamically learning and adding information, data, and knowledge to the database such that the range of questions, comments, tasks, and the like that are addressable by the chatbot using the response module increases over time. In some embodiments, conversational exchanges can be carried out to answer a range of questions [such as facts, definitions, how questions, why questions, hypothetical questions, semantically constrained questions, and cross-lingual questions). In addition, an artificial intelligence program used for natural language processing and generating chatbot responses can learn a user's preferences, can build a user-specific profile that can be considered in generating responses for that user, can learn the semantic and linguistic characteristics specific to the user, and/or can catalog the various other chatbots associated with the smart device of the user and/or with third party organizations that are associated with other chatbots to which a communication has been established.

In some embodiments, a chatbot may comprise at least one of a messaging chatbot, an audio chatbot, a visual chatbot, an audio-visual chatbot, a holographic chatbot, an augmented reality chatbot, a virtual reality chatbot, variations thereof, and/or the like. In some embodiments, the chatbot may be configured to receive commands from a user, viewer, or payor associated with an account, a product, a service, or any other suitable interaction that a user, viewer, or payor may have with the chatbot.

In some embodiments, security measures may be taken wherein the chatbot, device running the chatbot, or third party system may request a password, pin number, fingerprint, iris scan, facial recognition, vocal print, an associated telephone number, a full or partial social security number, an account number, two-factor authentication via a cell phone, application email, SMS message, public key infrastructure, combinations thereof, or the like before establishing a conversation with the user's device.

In one embodiment, when a user initiates a user session with a smart device, the smart device may call up a managing chatbot that can initiate and lead a dialogue with the user via the smart device and can use artificial intelligence or the like to determine the intent of the question. Based upon the intent of the question, the managing chatbot may call up one or more other chatbots that are specifically configured to address a particular type of intent or a particular category of dialogue. In some embodiments, the managing chatbot may receive (e.g., via the smart device) a first user question (e.g., a user input), determine the intent of the first user question, call up a first other chatbot that is configured to generate response dialogue based upon the first user question, relay the generated answer from the first other chatbot to the user via the smart device, and then wait to receive a second user question. In some embodiments, the first other chatbot may remain called up or activated while the managing chatbot waits to receive the second user question. Once the managing chatbot receives the second user question, the managing chatbot may determine whether the intent of the second user question is suitably similar to the intent of the first user question, and, in an instance in which the intent of the second user question is similar enough to the intent of the first user question, the managing chatbot may simply relay the second user question (as audio of the second user question or as a parsed textual transcription of the audio of the second user question) to the first other chatbot. In an instance in which the second user question has an intent that is different from (or not sufficiently similar to) the intent of the first user question, the managing chatbot may call up a second other chatbot that is configured to generate response dialogue based upon the second user question, relay the generated answer from the second other chatbot to the user via the smart device, and then wait to receive subsequent user questions. This process of determining which of the one or more other chatbots to call upon to generate response dialogue may continue until the user discontinues the dialogue or the dialogue is otherwise discontinued.

In some embodiments, the managing chatbot may be configured to establish a secured connection to a variety of network entities, such as elements of the network 210. In some embodiments, the smart device can act as the managing chatbot. In some embodiments, the smart device may be a smart speaker, a smartphone, or the like, and can comprise a processor that is configured to carry out a computer process stored on a memory device. In some embodiments, the smart device may cause the processor to initiate a computer program that can establish such secure connections with the variety of network entities, such as a company, vendor, organization, or the like. In some embodiments, the smart device or managing chatbot may call up or dismiss one or more chatbots to generate coherent responses to a user's questions to achieve a coherent dialogue. In some embodiments, the smart device or managing chatbot may access an application programming interface (API) or a data exchange that is configured to retrieve information from one or more databases or network entities. Said another way, the smart device or managing chatbot may call upon a chatbot to establish a secure connection with a network or database of a particular company or organization to retrieve relevant information for purposes of generating the coherent responses to the user's questions.

In some embodiments, a managing chatbot may maintain a single user session and call upon one or more other chatbots to provide data, metadata, textual content, verbal content, audio content, visual content, and/or the like. In some embodiments, the managing chatbot may determine, while interacting with another chatbot in response to a user question, that the managing chatbot and the other chatbot are unable to understand or respond to the user's question. In such an instance, the managing chatbot may ask the user for clarification or additional input to assist the managing chatbot in retrieving a suitable answer to the user's question. However, asking a user for further input may result in a disjointed or unpleasant experience for the user. In other embodiments, the managing chatbot may escalate, or cause the other chatbot to escalate, the user's question to an assisting source, such as a call center or the like. In some embodiments, the chatbot may be able to answer some of the user's question or is simply missing one or more pieces of relevant information to form a proper answer for the user. Continuing with this embodiment, the chatbot may escalate the user's question to the assisting source by transmitting the user's original question in full, such as in an audio format or a textual format, or can generate and transmit a new question directed to the portion of the user's question that the chatbot is unable to answer or to the one or more missing pieces of relevant information. Said another way, the chatbot can ask for assistance from an assisting source, such as a human in a call center, an artificial intelligence module, a chatbot with access to more or difference databases, and/or the like.

In an instance in which the assisting source is a human in a call center or the like, the chatbot can establish a connection, such as a secure connection, with the call center, provide a question to a server or network of the call center such that the question is caused to be routed to a human in the call center, and provide contextual information and/or authentication indicia necessary for the human to carry out the task of answering the question. The chatbot can then wait to receive an answer to their question from the human, at which time the chatbot can terminate the connection with the call center or the like. The user may or may not be made aware of the connection with and communication between the call center and the chatbot. In some instances, notifying the user that the question or a portion of the question has been escalated to an assisting source, such as a human or an artificial intelligence module, may be desirable, while in other instances notifying the user may not be desirable. Whether the user is notified or not that an assisting source provided some or all of the information for the chatbot to answer the question, the chatbot is configured thereafter to either provide the answer from the assisting source without further formatting or to combine some or all of the answer from the assisting source with other content or data already gathered or generated by the chatbot or other chatbot to create a semantically coherent answer to the user's question.

In other embodiments, the chatbot may provide a question to an assisting source, such as described above, such that the assisting source can provide clarification assistance to the chatbot. Such clarification assistance can include a clarification about a word or phrase from the user's question, the intent of the user's question, a tone or mood of a user's question, and/or the like. Said another way, if the chatbot is unable to interpret what the user is asking in their question, in full or in part, the chatbot is able to reach out to an assisting source, such as a human in a call center, to provide temporary assistance with interpreting the user's question such that the chatbot can thereafter gather the necessary information from the appropriate databases, networks, servers, other chatbots, and/or the like, and generate the response dialogue element that answers the user's question.

In some embodiments, a user can ask a first question about a first account or user profile that they have established with a first organization, causing the smart device or managing chatbot to call up a first child chatbot that is configured to establish a secure connection to the first organization and retrieve relevant account or user profile data. By way of example only, the first organization can be a bank at which the user has checking and savings accounts. The smart device may call up a chatbot that is controlled by the bank using a pre-authenticated secure connection or can ask the user for authentication indicia to provide the bank's chatbot to establish the secure connection and authorize retrieval of the secure account or user profile data from the bank associated with the user's account. During the same dialogue (e.g., before or after the first question) between the user and the smart device or managing chatbot, the user may ask a second question about a user's mobile phone account or customer profile with a mobile phone service provider. Since the bank's chatbot is not associated with the mobile phone service provider, the smart device or managing chatbot may call up a second child chatbot, such as a chatbot provided by the mobile phone service provider, that is configured to establish a secure connection with a network or database of the mobile phone service provider. The smart device or managing chatbot may then engage the second chatbot to generate responses to the user's questions and to continue the dialogue with the user. In some embodiments, the smart device or managing chatbot may be pre-authorized with the second chatbot or the mobile phone service provider such that the second chatbot can establish a secure connection between the smart device and a network or database of the mobile phone service provider. In other embodiments, the smart device or managing chatbot may not be preauthorized with the second chatbot or the mobile phone service provider, such that the managing chatbot or the second chatbot may be configured to ask the user for other authentication indicia to provide to the mobile phone service provider to authorize the smart device or managing chatbot to establish the secure connection, via the second child chatbot, between the smart device and the network or database of the mobile phone service provider.

In some embodiments, the smart device or managing chatbot may not be pre-configured to call up a particular chatbot, such as a new chatbot for a business or organization with which the user has no pre-existing relationship. In such embodiments, the smart device or managing chatbot can be configured to send a request message to the new chatbot to provide user identification or authentication information to establish a relationship with the organization or business that is hosting the new chatbot. Said another way, if a user wants to establish a user profile with a new organization that they have no pre-existing relationship, the smart device or managing chatbot can send a request, such as an association request or a connection request, to a chatbot managed by or hosted by the new organization, and then relay requested setup details from the chatbot for the new organization back to the user via the smart device, and likewise can relay the user's response to these requests for setup details back to the chatbot for the new organization, such that the chatbot for the new organization can initiate a new user profile or account for the user. In some embodiments, some or all of the new account setup details associated with the user may be known by or stored at the smart device or a storage device accessible by the managing chatbot. In such an instance, it may be possible for the user to ask their smart device to set up a new account at the new organization, and the smart device or managing chatbot can work in the background without any or minimal further user input or responses to set up the new user profile or account with the new organization by way of a dialogue between the smart device or managing chatbot and the chatbot of the new organization.

Figure 3:
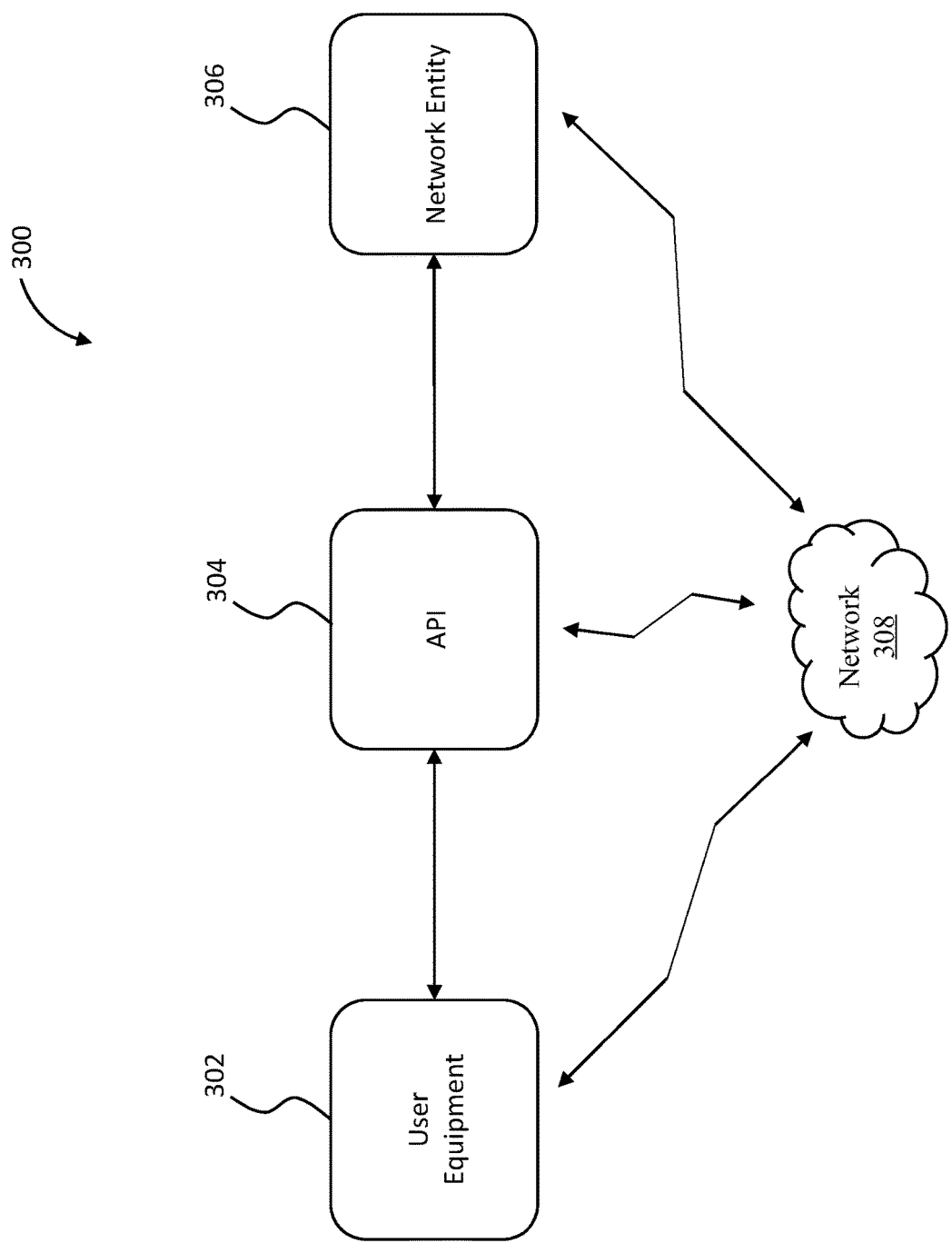
FIG. 3 is a diagram illustrating a system for carrying out one or more aspects of the currently disclosed invention.

In some embodiments, the managing chatbot can be hosted by or can be used in conjunction with a data exchange API. In some embodiments, the data exchange API can be used to request, transfer, store, recall, exchange, or otherwise handle the user's data and/or data associated with the various child chatbots that are configured for connection with or communication with the smart device or chatbot. For instance, such a system 300 is illustrated in FIG. 3. In some embodiments, user equipment 302 such as the smart device, can be configured to be in communication with an API 304. In some embodiments, the API 304 can be configured to be in communication with one or more network entities 306, such as a network or database of various organizations or businesses. In some embodiments, each of the user equipment 302, API 304, and network entity 306 can be configured to connect to a network 308, such as the Internet, such that communication can be secured and routed along traditional channels of inter-network entity and inter-smart device communication. By way of example only, the network 308 can comprise a distributed mobile network or public land mobile network (PLMN) such that the user equipment 302 (e.g., smart device) can establish an association or connection directly via the network 308 to any of the API 304, network entity 306, and/or the like. Other suitable networks and communications technologies are described elsewhere herein, and other known network types and communication technologies not disclosed herein are also contemplated.

In some embodiments, especially when an organization or business hosting a child chatbot is a bank or other financial instruction, a payment processing company, a merchant, or the like, it may be helpful for a third-party organization, interstitial chatbot, or a data exchange API to provide a list of authorized payors and payees to be cross-checked by both the smart device or managing chatbot and the child chatbot of the organization or business hosting the child chatbot.

Figure 4:
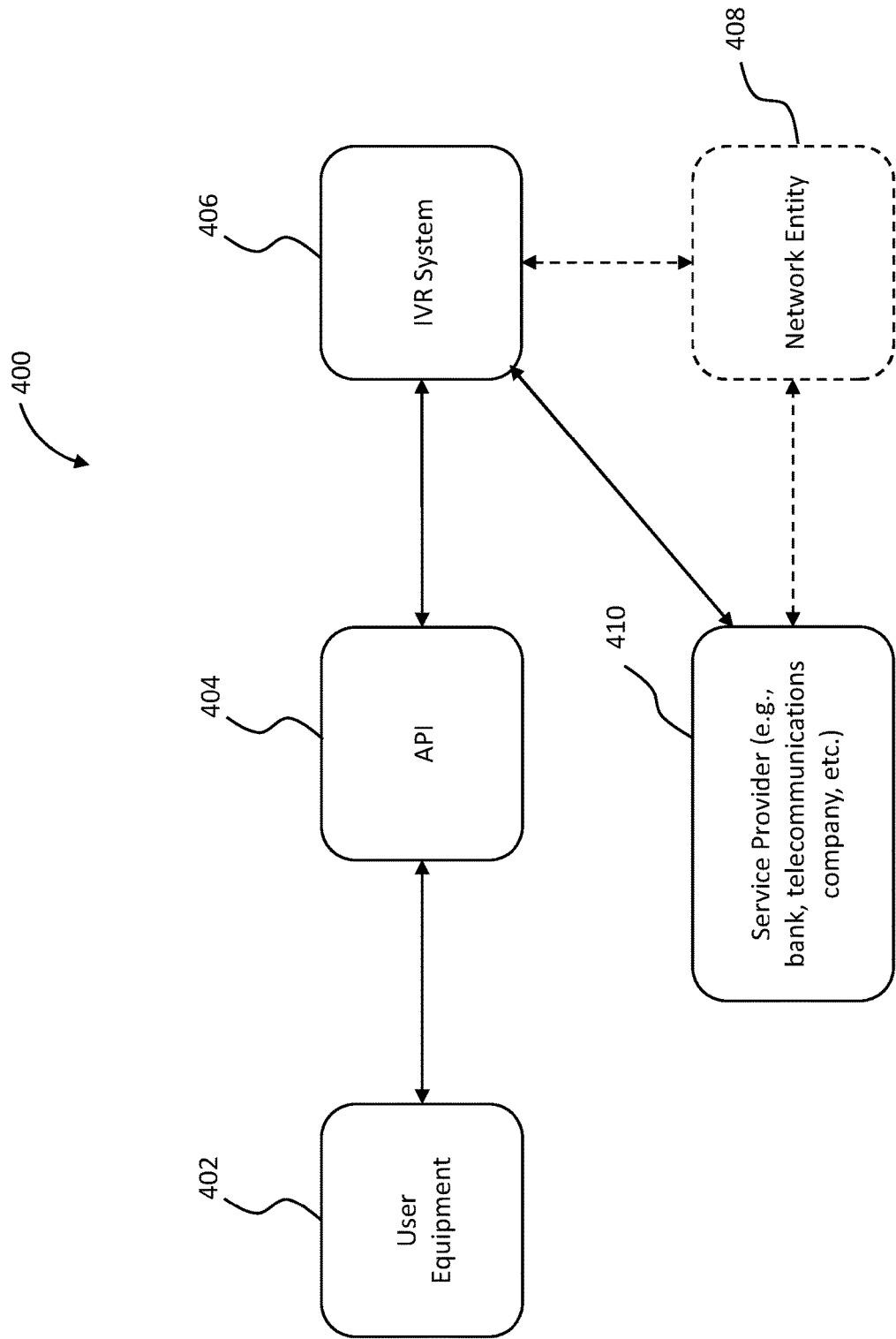
FIG. 4 is a diagram illustrating a system for carrying out one or more aspects of the currently disclosed invention.

Referring now to FIG. 4, a similar automated system 400, using such an API 404, is configured to initiate a call (e.g., as Voice over Internet Protocol communications) between a user equipment 402 (e.g., the smart device or managing chatbot) and an integrated voice response (IVR) system, such as an IVR system 406 (which may be similar to the IVR systems typically used to provide prompts to a caller that prompt the caller to provide vocal responses to said prompts which can help the IVR system route the caller to a desired destination within the IVR system). Said another way, the user may ask the user equipment 402 (e.g., their smart device) to initiate a call with a particular service provider 410, the user equipment 402 can ask the API 404 to route a VoIP call to the IVR system 406 of the service provider 410, and the IVR system may be in communication with a network or database of the service provider 410. In some instance, the IVR system 406 may not be in direct communication with the service provider 410, but instead may communicate with a network entity 408 that is associated with or in communication with the service provider 410.

By way of example only, a user may ask their smart device to call a bank at which they are a customer to request a transfer of funds from their account to a different account. The smart device can then initiate a call, such as a VoIP call, with the IVR system associated with the bank, such as by directing the call to a hotline phone number or a toll-free number pre-determined by the smart device to be associated with the bank. Alternatively, the hotline or toll-free number may be provided at the time of the user's request or in response to a request for the same information by the smart device. In another embodiment, the smart device may not know or have access to a pre-determined hotline number or toll-free number associated with the bank and may instead conduct a search for the hotline number or toll-free number, e.g., using the Internet. However, the smart device determines or receives the relevant telephone number or routing address (HTTP address, IP address, or the like) associated with the IVR system, the smart device can then initiate a call to that IVR system. Once the IVR system accepts the call from the smart device (or API, in some instances) the IVR system will provide a series of prompts, which can be numerical, tonal, alphabetical, or in any other format, each prompt associated with a particular department, issue, question, user type, or the like. The series of prompts can be presented in a serial manner, meaning that they are presented in a chronological order. The IVR system can either present a first prompt and then wait for a binary response (e.g., accept or reject) from the smart device, or conversely the IVR system can present each sequential prompt and leave sufficient time between each prompt such that, when the desired prompt is reached, the smart device is able to convey a single acceptance response. In some embodiments, a call to an IVR system may require multiple prompts before the caller is properly routed to their desired destination with in the IVR system. In such cases, the back-and-forth between the IVR system and the smart device may be carried out without the knowledge of or input from the user to properly route the user's call to the IVR system. In some embodiments, the smart device may already have access to user-provided information, such as payment information, a user's personally identifying information, or the like, such that the smart device can provide such information if prompted for such information by the IVR system.

Returning back to the preceding example in which the user asks their smart device to call a bank of which they are a customer, the smart device may manage some or all of the IVR routing process in the background without any or minimal input from the user, and then hand off the call to the user if the desired destination or an intent of the call necessitates a human-to-human interaction or if the smart device is not able to provide all of the information required to reach the desired destination within the IVR system. Alternatively, if the smart device cannot provide all the information required by the IVR system to reach the user's desired destination within the IVR system, the smart device may simply ask for input from the user, listen for the input or feedback from the user, and then either relay this information to the IVR system as an audio recording or transfer this audio recording to a textual transcription or other sort of data format before relaying the information to the IVR system. In some embodiments, once the destination is reached within the IVR system, the smart device may hand the call off to the user who can complete the call directly with the IVR system, call center personnel, or the like, by speaking to their smart device. If the user would like to terminate the call, the user may simply instruct the smart device to terminate the call or can depress a button or make another such gesture input to their smart device suitable to communicate that the call should be terminated.

When a user calls an IVR system, especially when the destination is a switchboard, call center, human-response line, or the like, the user may need to wait a period of time before the call can continue. In some embodiments in which the user asks the smart device to initiate a call an IVR system of a business or organization (e.g., their bank), the smart device may reach the desired destination and detect that the call is on hold or has been queued for some period of time. When a call initiated by and/or handled by the smart device has been queued for later handling or is placed on hold, the smart device can delay handing off the call to the user until a representative picks up the call.

Figure 5:
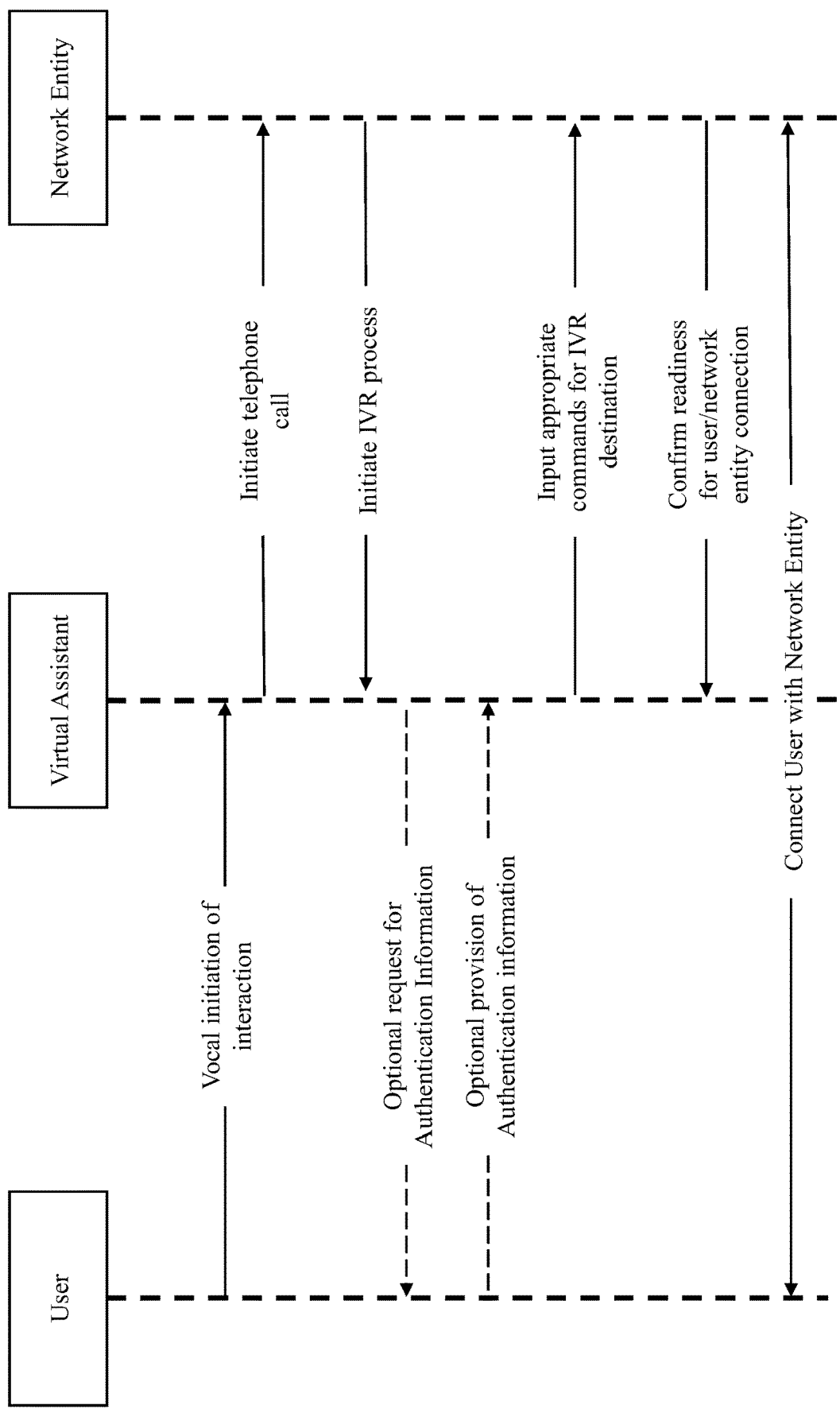
FIG. 5 is a transaction map illustrating transactions between a payor and a payee by way of an apparatus or cloud service, according to one or more aspects of the currently disclosed invention.

By way of example only, the smart device can receive a prompt from the IVR system to select between commercial banking and retail banking, to which the smart device can relay a response selecting retail banking. Subsequently, the IVR system can communicate a prompt to select between call intents, including for example (a) check your account balance, (b) report fraudulent activity on your account, (c) open a new account, (d) pay a bill, (e) transfer funds between accounts, (f) initiate a wire transfer, (g) change your contact information, (h) find your nearest banking location or ATM, etc. In response to the IVR system prompt to select between call intents, the smart device can relay a selection of option (e) since the user communicated in their original request to the smart device that their intent is to request a transfer of funds from their account to another account. If, for instance, the smart device is uncertain whether to select, for instance, option (e) or option (f) based on a lack of information from the user about whether the transfer of funds is a wire transfer or an electronic funds transfer within the same bank, the smart device may simply pause the IVR system and ask the user for clarification about whether the funds transfer should be electronic or a wire transfer. In some embodiments, the smart device may be configured to determine a probability based upon semantic analysis of the user's initial request or other such inputs to calculate a probability between two or more options from a list of prompts, and may decide to select the option with the highest probability instead of requesting further information from the user or based on other information such as payee routing information or account information. Once the IVR system receives the selection of call intent (e), the IVR system might request the funds transfer details (e.g., amount to be transferred, sending account number, receiving account number, routing number, etc.) in an attempt to at least semi-automate the electronic funds transfer process. In some embodiments, the IVR system might first request authentication indicia from the smart device. If the smart device has the authentication indicia readily available, the smart device can provide the authentication indicia and proceed to the IVR systems request for the funds transfer details. In some embodiments, for instance if the user provided some or all of the funds transfer details with the initial request or in a subsequent input, the smart device may provide the available funds transfer details to the IVR system. In an instance in which the smart device does not have access to or already have available some or all of the funds transfer details or authentication indicia, the smart device may request the missing funds transfer details or authentication indicia from the user, and then relay the missing funds transfer details or authentication indicia to the IVR system to proceed with the at least semi-automated funds transfer. If neither the user nor the smart device have access to or know at least one funds transfer detail requested by the IVR system, the smart device might request that the IVR system attempt to find and provide the missing funds transfer detail, or the smart device can escalate the call within the IVR system to reach a human that might be able to look up or provide the missing funds transfer detail. Such an interaction between the user, smart device, and IVR system is outlined, according to a particular embodiment, in FIG. 5.

In some embodiments, such a dialogue between a user's smart device and an IVR system of, for instance, the user's bank, may require that the user's smart device retrieves information from another IVR system or another business or organization other than the business or organization that hosts and manages the primary IVR system. In such an embodiment, the smart device may initiate a second call, such as a VoIP call, with the secondary IVR system. For instance, continuing with the above embodiment in which the smart device is attempting to automatically transfer funds between accounts by initiating a call to the IVR of the user's bank, the other account to which the user is transferring funds may be a user's account at another bank, another payee account at the same bank, or an account at a different type of organization or financial institution that is not a bank. In such a circumstance, if the smart device does not know the account details of the other account at the other bank, the smart device may initiate a parallel call to the IVR system of the other bank to retrieve the relevant missing account details associated with the other account at the other bank.

The general framework of IVR systems are discussed in more detail in U.S. Patent Application No. 2018/0137295 (hereinafter "the '295 Publication"), the entire contents of which are hereby incorporated herein by reference for all purposes. In some embodiments, such as described in further detail in the '295 Publication, context information (such as information about the reason for the call, the type of caller, the account type, the user identification number, and/or the like) can be relayed to the IVR system at the outset of a call so as to transfer the call directly to a particular point within the IVR call tree (which is the structure of the IVR system through which the IVR system prompts callers to reach their desired destination). For instance, in the context of this disclosure, the smart device may convey the context information to the IVR system to indicate to the IVR system a particular point down the call tree to which to transfer the call. In some embodiments, the smart device may store information related to past similar calls such that when the user instructs the smart device to make such a call in the future to the same IVR system, the smart device can remember the structure of the call tree and at least attempt to jump to some lower point in the call tree to avoid the required back and forth between the IVR system and the smart device.

In some embodiments, a user may ask their smart device to initiate a call to an IVR system, and then subsequently determine that they need to leave the location of their smart device or otherwise may become unreachable. By way of example only, a smart device may be a smart home device, such as the Amazon® Alexa device, that is not a mobile device but is rather configured to remain in a relatively fixed location during use (e.g., may require a direct power connection to a power outlet of the user's home). In such embodiments, the user may need to leave their home after having asked their smart device to initiate the call to the IVR system. As such, in response to the user indicating that they need to leave during the call to the IVR system, the smart device may work in the background, and after the user leaves can be configured to forward the call to another user device (such as a cell phone, smart phone, land line, or the like) based upon contemporaneous user instructions or standing user preferences. By doing so, the smart device can wait until the call has reached the desired destination and then forward the call to the user's other device so the user can be connected to the IVR system to finalize the call. Likewise, the smart device may carry out the call and navigate the IVR system call tree without user input, and then if user input is required at some point during the call, the smart device may reach out to the user via their other device to receive the further input needed by the user to complete the call to the IVR system. Continuing the example from above in which the user has requested the smart device to initiate a funds transfer from an account at their bank, the smart device may initiate the call, carry out most of the call without user input, and then reach a point at which the user's authentication indicia are needed, and can then call the user on their cell phone to carry out a vocal print or so the user can input their pin using the touch-tone keypad, or can prompt the user to provide their fingerprint by pushing a request through an application stored on their smartphone, or by any other suitable means.

Figure 6:
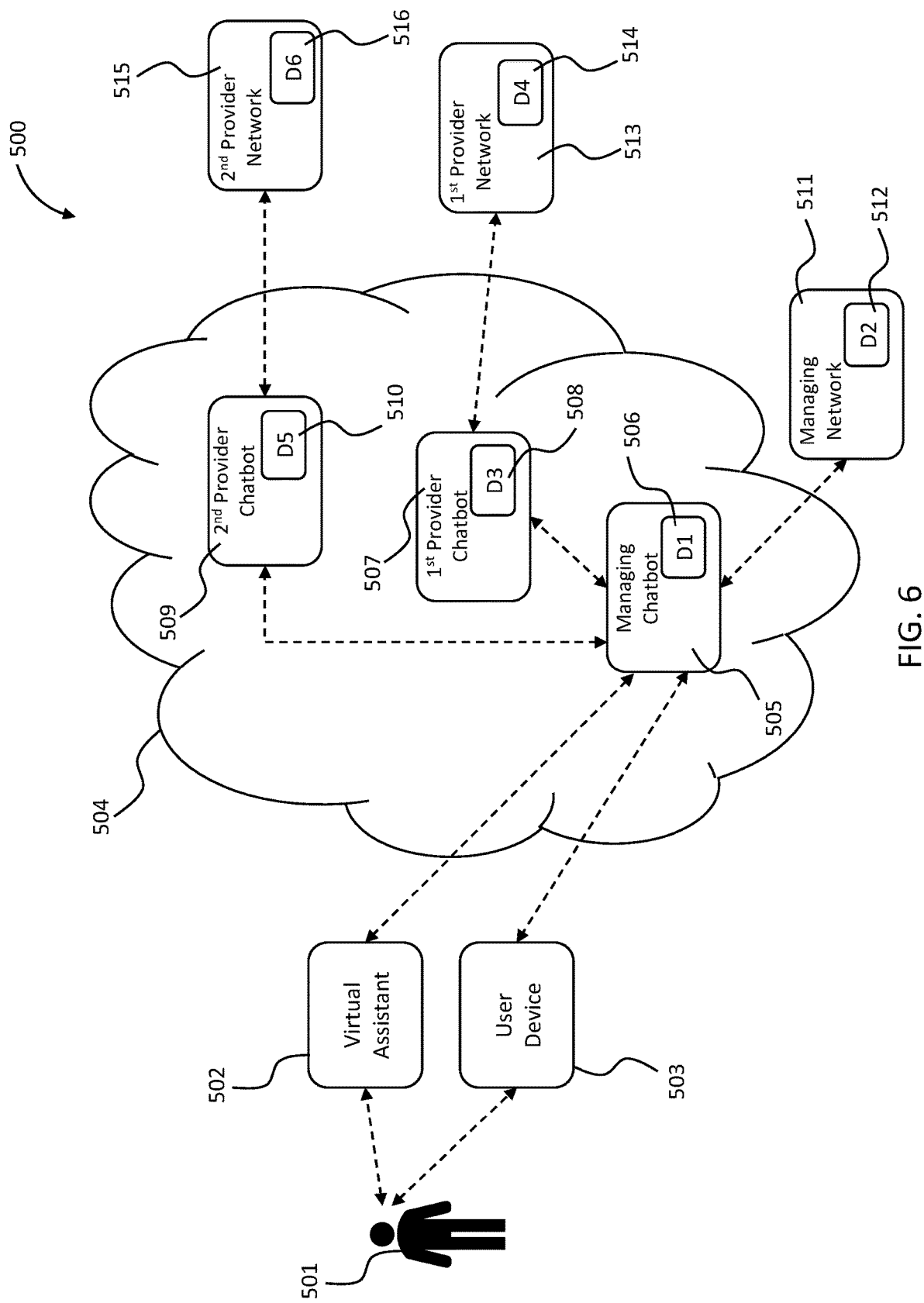
FIG. 6 is an aggregated chatbot system, according to one or more aspects of the currently disclosed invention.

Referring now to FIG. 6, a system 500 is provided for a user 501 to engage with a virtual assistant 502 and/or a user device 503, causing the virtual assistant 502 and/or the user deice 503 to connect with a cloud 504. In some embodiments, the cloud 504 can comprise a cloud computing environment, one or more servers, one or more virtual computers, one or more base stations, the Internet, and/or other network entities. In some embodiments, a managing chatbot 505 can be stored on and/or controlled through the cloud 504. In some embodiments, the managing chatbot 505 can comprise or be in operable communication with a database 506, the database 506 configured to store information related to the user 501, virtual assistant 502, user device 503, information about one or more accounts associated with the user 501, authentication indicia associated with said one or more accounts, and/or the like. In some embodiments, the system 500 can further comprise a first provider chatbot 507, a first provider database 508, a second provider chatbot 509, and a second provider database 510. In some embodiments, the first provider chatbot 507, the first provider database 508, the second provider chatbot 509, and/or the second provider database 510 can be stored on the cloud 504. In some embodiments, the cloud 504 can include more than one separate and secure computing environment and one or more of the first provider chatbot 507, the first provider database 508, the second provider chatbot 509, and/or the second provider database 510 can be stored on different of the separate and secure computing environments.

In some embodiments, the managing chatbot 505 can be configured to receive or otherwise obtain personal information such as account numbers, account balance information, payment histories, payment due dates, and the like. By way of example only, the user 501 may have an electronic mail (email) address for correspondence with a bank at which they have an account and an electricity provider at which they have an account. The user 501 may notify the managing chatbot 505 about the email address and provide authorization at the virtual assistant 502 or the user device 503 for the managing chatbot 505 to review email related to the user's accounts at the bank and the electricity provider. By doing so, the managing chatbot 505 may store, for instance in the database 506, the information gathered from the user's email related to the bank and the electricity provider. In such an example, the managing chatbot 505 can then provide feedback to the user 501, such as via the virtual assistant 502 or the user device 503, related to their accounts at the bank and the electricity provider. As discussed elsewhere herein, the user 501 can engage their virtual assistant 502, for instance, by asking a first question that can be answered by the managing chatbot 505 based upon information stored at the database 506. In an instance in which the managing chatbot 505 is not able to generate an answer to the user's question based upon the information stored at the database 506, the managing chatbot 505 may initiate a communication with one of the first provider chatbot 507 or the second provider chatbot 509, depending upon the intent of the user's question and the respective one of the first provider chatbot 507 and the second provider chatbot 509 associated with the correct entity associated with the intent of the user's question. For example, the user 501 may ask about the current balance in their checking account, which would be interpreted by, for instance, the virtual assistant 502 or the managing chatbot 505 as being directed to the bank, which would cause the managing chatbot 505 to initiate a communication channel between the managing chatbot 505 and the first provider chatbot 507 associated with and/or managing by the bank.

If the first provider chatbot 507 is unable to generate an answer to the user's question based upon the information provided by the user 501, the managing chatbot 505, and/or stored at the first provider database 508, the managing chatbot 505 may need to initiate a communication channel with a managing network 511 storing or in communication with a managing network database 512, or the first provider chatbot 507 may need to initiate a communication channel with a first provider network 513 and/or a first provider network database 514. One or more of the managing network 511 and the first provider network 513 may be outside the cloud 504, such as on a separate cloud. In order to do so, the first provider chatbot 507 may need to request authentication indicia from the managing chatbot 505, which may already have such information stored in the database 506 or which may need to request such information from the user 501. For example, the first provider chatbot 507 may need to request the username and password associated with the user's account at the bank, which would allow the first provider chatbot 507 to establish the communication with the first provider network 513. In some embodiments, the managing chatbot 505 may not already know the network architecture, organizational structure, policies and procedures, data storage formats, search protocol, terminology, coding, or the like for the first provider network 513 and the first provider network database 514, however the first provider chatbot 507 is configured to communicate effectively with the first provider network in order to successfully generate an answer to the user's question. For instance, if the user's question is related to their current checking account balance, the managing chatbot 505 may already know this from having extracted this information from a recent account statement provided by the bank to the user at their email address, however if the question is related to information or account activities that were not provided in communication received at the user's email address or otherwise directly accessible by the managing chatbot 505, then the managing chatbot 505 may need to call up the first provider chatbot 507 to provide a suitable answer to the user's question.

By way of example only, the user's question may be related to how much their bill from the electricity provider was last month, which may be a line item in a statement received at the user's email address. While the first provider chatbot 507 is obtaining relevant information necessary to generate a response to the user's question, the user 501 may ask a separate question related to how much electricity was used last month, which may not be reflected in the user's recent statement, which may necessitate the managing chatbot 505 establishing a connection to the second provider chatbot 509 and/or the second provider database 510 in order for the second provider chatbot 509 to provide the missing information related to electricity usage by the user 501 in the preceding month. In an instance in which the second provider chatbot 509 is unable to generate an answer to the user's question or provide the necessary information the managing chatbot 505 to do the same, the second provider chatbot 509 may establish a communication channel with a second provider network 515 and/or a second provider network database 516, which may be located outside the cloud 504. While FIG. 6 illustrates only two provider chatbots and two provider networks in the system 500, the system 500 may comprise more chatbots and/or provider networks, as suitable.

In such a way, the user 501 may ask their virtual assistant 502 a series of questions which may or may not require the managing chatbot 505 to establish channels of communication with one or more other chatbots that are all aggregated and organized by the managing chatbot 505. In many instances, it may be helpful for some or all of these processes and steps to be carried out in the background without the user 501 realizing what is occurring, especially when the user has already provided all required information for the one or more provider chatbots or provider networks to provide the relevant information and/or generate an answer to the user's question. However, in other instances, it may be helpful to alert the user 501 when the managing chatbot 505 instantiates one or more provider chatbots 507, 509, etc., so the user may exert some control over the organizations and systems between which their information is shared and/or within which their information is stored.

Figure 7:
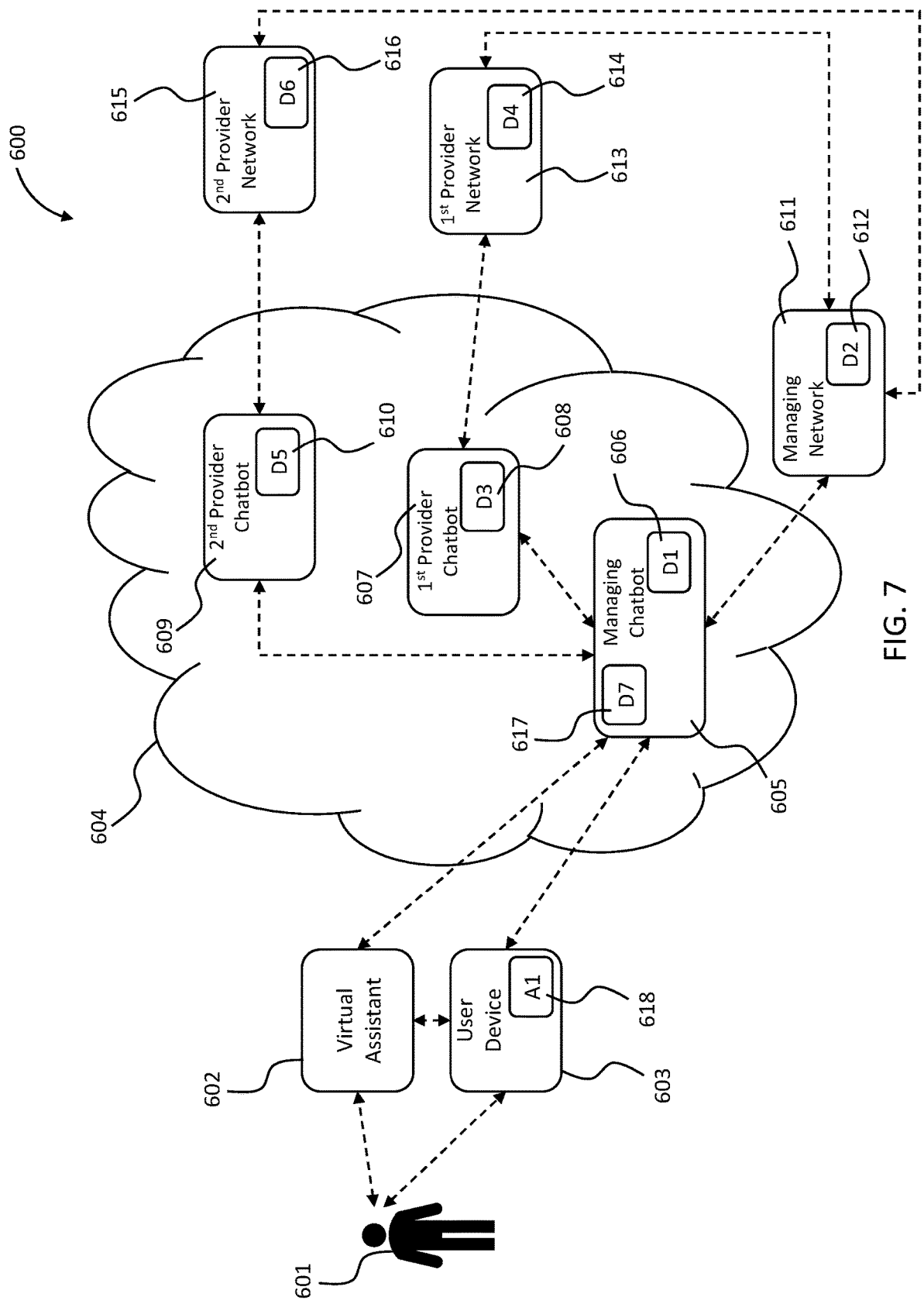
FIG. 7 is an aggregated chatbot system, according to one or more aspects of the currently disclosed invention.

Referring now to FIG. 7, a system 600 is provided for a user 601 to engage with a virtual assistant 602 and/or a user device 603, causing the virtual assistant 602 and/or the user deice 603 to connect with a cloud 604. In some embodiments, the managing chatbot 605 can comprise or be in operable communication with a database 606, the database 606 configured to store information related to the user 601, virtual assistant 602, user device 603, information about one or more accounts associated with the user 601, authentication indicia associated with said one or more accounts, and/or the like. In some embodiments, the user 601 may ask a question or a series of questions, such as part of a longer conversation with the virtual assistance 602, which may trigger the virtual assistant 602 to instantiate or call up the managing chatbot 605. In some embodiments, the virtual assistant 602 can be in communication with, controlled at least partially by, and/or stored on the user device 603. By way of example only, the user device 603 may be a cell phone wherein the virtual assistant 602 comprises an application or other such program stored on the cell phone. In some embodiments, the user 601 can use a touch screen of the cell phone to initiate a virtual assistant 602, and the user 601 can then communicate either textually or verbally with the virtual assistant 602 to communicate their question.

In some embodiments, the system 600 can further comprise a first provider chatbot 607, a first provider database 608, a second provider chatbot 609, and a second provider database 610. In some embodiments, the first provider chatbot 607, the first provider database 608, the second provider chatbot 609, and/or the second provider database 610 can be stored on the cloud 604. In some embodiments, the cloud 604 can include more than one separate and secure computing environment and one or more of the first provider chatbot 607, the first provider database 608, the second provider chatbot 509, and/or the second provider database 610 can be stored on different of the separate and secure computing environments.

The managing chatbot 605 may be communication with a managing network 611 and/or a managing network database 612. The first provider chatbot 607 may be in communication with a first provider network 613 and/or a first provider network database 614. The second provider chatbot 609 may be in communication with a second provider network 615 and/or a second provider network database 616. One or more of the managing network 611, the first provider network 613, and the second provider network 615 may be outside the cloud 604.

In some embodiments, managing chatbot 605 can be configured to receive or otherwise obtain personal information such as account numbers, account balance information, payment histories, payment due dates, and the like, from the user device 603 and store such personal information in the database 606 or in a separate database 617. In some embodiments, the user device 603 can further comprise or be in operable communication with a user device database 618 that is configured to store the user's personal information such that the managing chatbot 605 can access the personal information stored at the user device database 618. By way of example only, the user 601 may have an electronic mail (email) address for correspondence with a bank at which they have an account and an electricity provider at which they have an account. The user 601 may authorize an application or the like stored at the use equipment 603 to review email related to the user's accounts at the bank and the electricity provider. By doing so, the user device 603 may store, for instance in the database 618, the information gathered from the user's email related to the bank and the electricity provider. As discussed elsewhere herein, the user 601 can engage their virtual assistant 602, for instance, by asking a first question that can be answered by the managing chatbot 605 based upon information stored at the database 606. In an instance in which the managing chatbot 605 is not able to generate an answer to the user's question based upon the information stored at the database 606, the managing chatbot 605 may initiate a communication with one of the first provider chatbot 607 or the second provider chatbot 609, depending upon the intent of the user's question and the respective one of the first provider chatbot 607 and the second provider chatbot 609 associated with the correct entity associated with the intent of the user's question. For example, the user 601 may ask about the current balance in their checking account, which would be interpreted by, for instance, the virtual assistant 602 or the managing chatbot 605 as being directed to the bank, which would cause the managing chatbot 605 to initiate a communication channel between the managing chatbot 605 and the first provider chatbot 607 associated with and/or managing by the bank. If the first or second provider chatbot 607, 609 is unable to answer the user's question without additional information, such as personally identifying information, account details, authentication indicia, or the like, the managing chatbot 605 may need to collect that information from the database 606, which may not be available in some instance or may be available, for example if such additional information has been requested by a provider chatbot in the past. In such an example, in response to the user 601 asking a question about their accounts at the bank or the electricity provider, the managing chatbot 605 can collect from the user device database 618 or the database 617 the relevant account information, authentication indicia, or the like, in order to provide the collected information to, for instance, the first provider chatbot 607 in order to cause the first provider chatbot 607 to generate a response to the user's question.

Said another way, the user device 603 can comprise or store an application or the like that collects user's information, upon authorization of the same by the user, in order to provide relevant information to the managing chatbot 605 upon request, while the managing chatbot 605 can stored information gathered from the various provider networks and provider chatbots (e.g., first provider 607, second provider 609, etc.) over the course of multiple interactions between the user 601 and the managing chatbot 605 and through the process of analyzing the user's email and the like and querying the provider chatbots and/or provider networks.

In some embodiments, it may be helpful for one or more of the provider networks 613, 615 to also be in communication with the managing network 611 such that the managing network 611 can store dynamically updated information provided by or requested from the provider networks 613, 615 locally in the managing network database 612. In some embodiments, the managing chatbot database 606 may be periodically synched with the managing network database 612 and the user equipment 603 can by periodically synched with the managing chatbot database 616 or the managing network database 612 directly in order for the user equipment 603 to have up-to-date information about the user's various accounts. In such a circumstance, for at least some of the user's question, the virtual assistant 602 may receive the user's question, query the user device 603 or the user device database 618, retrieve from such a source the necessary information, ad generate a suitable, conversationally coherent response to the user's question, all without requiring a connection to the cloud 604. This may be helpful in circumstances where the user device 603 is disconnected from the cloud 604, where the user has restricted traffic between the user device 603 and the cloud 604, or the like. Such an approach can also be used as a default protocol such that the virtual assistant 602 determines the user 601 has asked a question, looks for an answer in local communication with the user device database 618 and other local resources, and then only once the virtual assistant 602 determines that an answer to the user's question cannot be generated based solely on local resources, the virtual assistant 602 can establish the communication channel with the managing chatbot 605 at the cloud 604 as described hereinabove.

Figure 8:
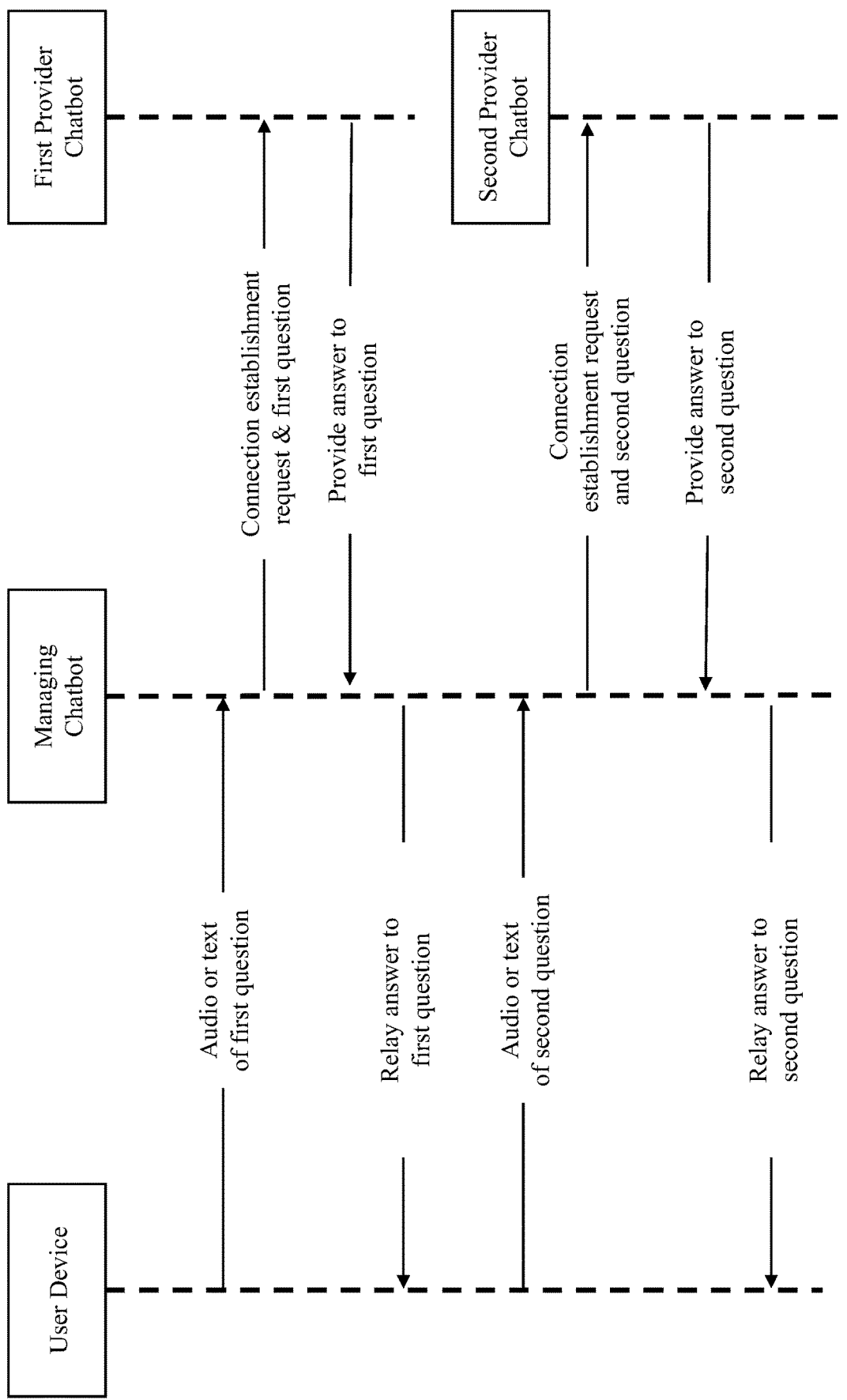
FIG. 8 is a transaction map illustrating transactions between a user device, a managing chatbot, and one or more other chatbots, according to a particular embodiment of the present invention.

Referring now to FIG. 8, an interaction map is presented illustrating the communication between the user device and the managing chatbot of a user's first question, the managing chatbot then determining whether the managing chatbot has readily available the necessary information to generate a response to the user's question. If the managing chatbot does not have the necessary information required to generate a response to the user's question, the managing chatbot can identify that the first provide chatbot is the proper entity to forward the user's question to, and can establish a communication channel with the first provider chatbot. The first provider chatbot can then receive the user's question and provide the managing chatbot with an answer to the user's question, which the managing chatbot can either simply relay to the user device for presentation to the user or can aggregate with other information or answers to prepare a semantically suitable answer to the user's question in a manner that is conversationally coherent. Either during or following the process of communicating between the user device, managing chatbot, and/or first provider chatbot, the user equipment can convey to the managing chatbot audio or text related to the user's second or subsequent question(s). The managing chatbot may determine, such as from the content or from the intent of the question, whether the managing chatbot can answer the user's second question based upon information stored locally at the user device or in the cloud at the managing chatbot or a database associated therewith. In an instance in which the managing chatbot determines that additional information needs to be gathered to generate an answer to the user's question, the managing chatbot may determine which of a plurality of provider chatbots is best suited for answering the user's second question.

In some instances, the managing chatbot may not know which provider chatbot is the best suited to answer the user's question, in which case the managing chatbot may determine a likelihood or probability, for more than one provider chatbot, that the respective chatbot is capable of answering the user's question, such as based upon the content or intent of the user's question. By way of example only, a user may ask "what is the balance in my account?" which may be an ambiguous enough question for the managing chatbot to not be able to differentiate between two or more of the provider chatbots. In such a circumstance, the managing chatbot can ask a first provider chatbot, wait to receive from the first provider chatbot an answer to the user's question or an indication that the first provider chatbot is unable to answer the user's question, and can then engage a second provider chatbot.

However, as illustrated in FIG. 8, if a managing chatbot determines that the user's second question is best answered by a second provider chatbot, the managing chatbot can request a connection between the managing chatbot and the second provider chatbot and convey the user's second question to the second provider chatbot. The second provider chatbot can then generate an answer to the user's second question, which can be relayed directly back to the user device by the managing chatbot or can be integrated into a conversational stream in such a way as to be conversationally coherent.

In some embodiments, a benefit of the system 600 and the corresponding approach and method is that the managing chatbot gathers a greater quantity and more updated information about the user and the user's accounts at the various providers over time as the managing chatbot attempts to answer more of the user's questions.

Figure 9:
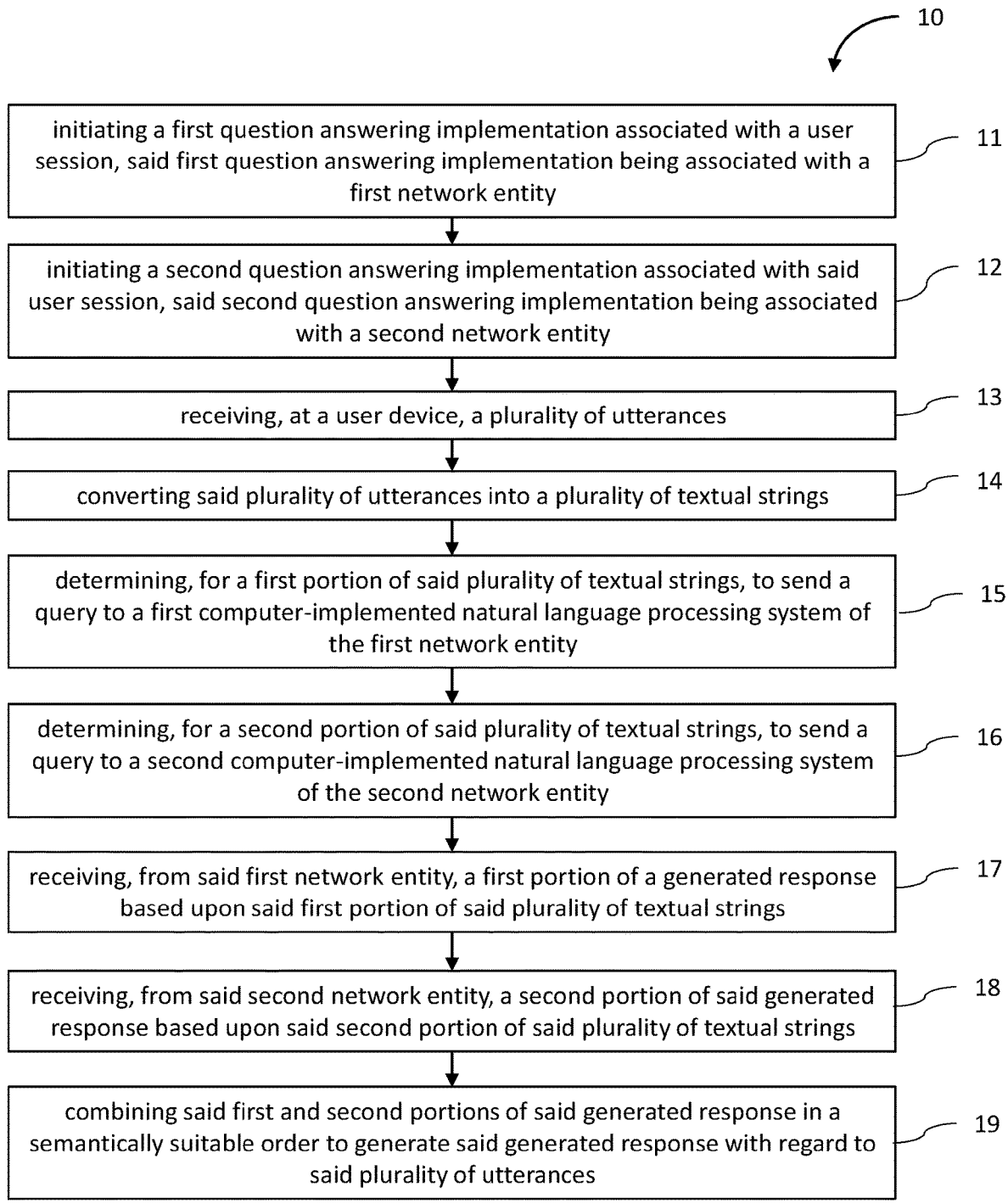
FIG. 9 is a block flow diagram of a method for presenting an interactive video representing secure, transactional information, according to a particular embodiment of the present invention.

Referring now to FIG. 9, a method 10 is provided for aggregating user sessions for conversational exchanges using a virtual assistant. In some embodiments, the method comprises initiating a first response module associated with a user session, said first response module being associated with a first network entity, at 11. In some embodiments, the method further comprises initiating a second response module associated with said user session, said second response module being associated with a second network entity, at 12. In some embodiments, the method further comprises receiving, at a user device, a plurality of utterances, at 13. In some embodiments, the method further comprises converting said plurality of utterances into a plurality of textual strings, at 14. In some embodiments, the method further comprises determining, for a first portion of said plurality of textual strings, to send a query to a first computer-implemented natural language processing system of the first network entity, at 15. In some embodiments, the method further comprises determining, for a second portion of said plurality of textual strings, to send a query to a second computer-implemented natural language processing system of the second network entity, at 16. In some embodiments, the method can further comprise receiving, from said first network entity, a first portion of a generated response based upon said first portion of said plurality of textual strings, at 17. In some embodiments, the method further comprises receiving, from said second network entity, a second portion of said generated response based upon said second portion of said plurality of textual strings, at 18. In some embodiments, the method further comprises combining said first and second portions of said generated response in a semantically suitable order to generate said generated response with regard to said plurality of utterances, at 19.

Figure 10:
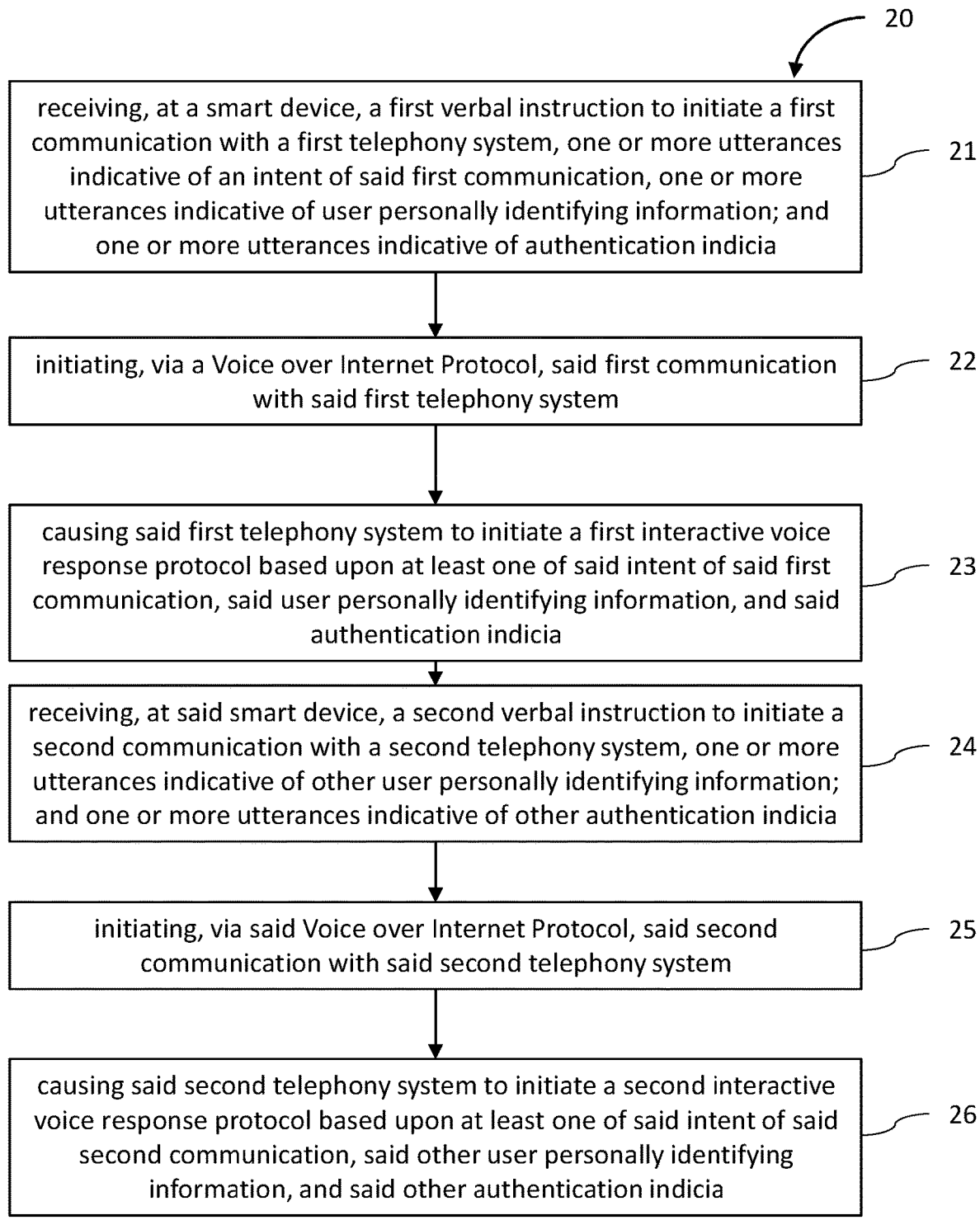
FIG. 10 is a block flow diagram of a method for presenting an interactive video representing secure, transactional information, according to a particular embodiment of the present invention.

Referring now to FIG. 10, a method 20 is provided for aggregating user sessions for conversational exchanges using interactive voice response. In some embodiments, the method can further comprise receiving, at a smart device, a first verbal instruction to initiate a first communication with a first telephone system, one or more utterances indicative of an intent of said first communication, one or more utterances indicative of user personally identifying information; and one or more utterances indicative of authentication indicia, at 21. In some embodiments, the method can further comprise initiating, for instance using voice-over-internet protocol (VoIP), said first communication with said first telephone system, at 22. In some embodiments, the method can further comprise causing said first telephone system to initiate a first interactive voice response protocol based upon at least one of said intent of said first communication, said user personally identifying information, and said authentication indicia, at 23. In some embodiments, the method can further comprise receiving, at said smart device, a second verbal instruction to initiate a second communication with a second telephone system, one or more utterances indicative of other user personally identifying information; and one or more utterances indicative of other authentication indicia, at 24. In some embodiments, the method can further comprise initiating, via said Voice over Internet Protocol, said second communication with said second telephone system, at 25. In some embodiments, the method can further comprise causing said second telephone system to initiate a second interactive voice response protocol based upon at least one of said intent of said second communication, said other user personally identifying information, and said other authentication indicia, at 26.

In some embodiments, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Methods, apparatuses, and computer program products are therefore provided in accordance with example embodiments to provide, for example, for aggregating user sessions for interactive transactions using virtual assistants, conversational artificial intelligence, and/or chatbots.

According to a first embodiment, a method is provided for aggregating user sessions for conversational exchanges using a virtual assistant. In some embodiments, the method can comprise initiating a first response module associated with a user session, said first response module being associated with a first network entity; initiating a second response module associated with said user session, said second response module being associated with a second network entity; receiving, at a user device, a plurality of utterances; converting said plurality of utterances into a plurality of textual strings; determining, for a first portion of said plurality of textual strings, to send a query to a first computer-implemented natural language processing system of the first network entity; determining, for a second portion of said plurality of textual strings, to send a query to a second computer-implemented natural language processing system of the second network entity; receiving, from said first network entity, a first portion of a generated response based upon said first portion of said plurality of textual strings; receiving, from said second network entity, a second portion of said generated response based upon said second portion of said plurality of textual strings; and combining said first and second portions of said generated response in a semantically suitable order to generate said generated response with regard to said plurality of utterances.

In some embodiments, the method can further comprise receiving, at said user device, a first triggering utterance, wherein the first triggering utterance includes a first command to contact said first network entity; and receiving, at said user device, a second triggering utterance, wherein the second triggering utterance includes a second command to contact said second network entity.

In some embodiments, the method can further comprise transmitting, to said user device, said generated response having said semantically suitable order with regard to said plurality of utterances.

According to a second embodiment, an apparatus is provided that comprises at least one processor and at least one memory including computer program instructions. In some embodiments, said at least one processor can be configured, with said at least one memory including computer program instructions, at least to initiate a first response module associated with a user session, said first response module being associated with a first network entity; initiate a second response module associated with said user session, said second response module being associated with a second network entity; receive, at a user device, a plurality of utterances; convert said plurality of utterances into a plurality of textual strings; determine, for a first portion of said plurality of textual strings, to send a query to a first computer-implemented natural language processing system of the first network entity; determine, for a second portion of said plurality of textual strings, to send a query to a second computer-implemented natural language processing system of the second network entity; receive, from said first network entity, a first portion of a generated response based upon said first portion of said plurality of textual strings; receive, from said second network entity, a second portion of said generated response based upon said second portion of said plurality of textual strings; and combine said first and second portions of said generated response in a semantically suitable order to generate said generated response with regard to said plurality of utterances.

In some embodiments, the at least one processor can be further configured, with said at least one memory including computer program instructions, at least to receive, at said user device, a first triggering utterance, wherein the first triggering utterance includes a first command to contact said first network entity; and receive, at said user device, a second triggering utterance, wherein the second triggering utterance includes a second command to contact said second network entity.

In some embodiments, the at least one processor can be configured, with said at least one memory including computer program instructions, at least to transmit, to said user device, said generated response having said semantically suitable order with regard to said plurality of utterances.

According to a third embodiment, at least one non-transitory computer readable medium is provided that comprises instructions that, when executed, cause a computing device to perform at least the following: initiate a first response module associated with a user session, said first response module being associated with a first network entity; initiate a second response module associated with said user session, said second response module being associated with a second network entity; receive, at a user device, a plurality of utterances; convert said plurality of utterances into a plurality of textual strings; determine, for a first portion of said plurality of textual strings, to send a query to a first computer-implemented natural language processing system of the first network entity; determine, for a second portion of said plurality of textual strings, to send a query to a second computer-implemented natural language processing system of the second network entity; receive, from said first network entity, a first portion of a generated response based upon said first portion of said plurality of textual strings; receive, from said second network entity, a second portion of said generated response based upon said second portion of said plurality of textual strings; and combine said first and second portions of said generated response in a semantically suitable order to generate said generated response with regard to said plurality of utterances.

In some embodiments, the at least one non-transitory computer readable medium of can further comprise instructions that, when executed, cause a computing device to perform at least the following: receive, at said user device, a first triggering utterance, wherein the first triggering utterance includes a first command to contact said first network entity; and receive, at said user device, a second triggering utterance, wherein the second triggering utterance includes a second command to contact said second network entity.

In some embodiments, the at least one non-transitory computer readable medium can further comprise instructions that, when executed, cause a computing device to perform at least the following: transmit, to said user device, said generated response having said semantically suitable order with regard to said plurality of utterances.

According to a fourth embodiment, a method is provided for aggregating user sessions for conversational exchanges using interactive voice response. In some embodiments, the method can comprise receiving, at a smart device, a first verbal instruction to initiate a first communication with a first telephone system, one or more utterances indicative of an intent of said first communication, one or more utterances indicative of user personally identifying information; and one or more utterances indicative of authentication indicia; initiating, for instance using voice-over-internet protocol (VoIP), said first communication with said first telephone system; causing said first telephone system to initiate a first interactive voice response protocol based upon at least one of said intent of said first communication, said user personally identifying information, and said authentication indicia; receiving, at said smart device, a second verbal instruction to initiate a second communication with a second telephone system, one or more utterances indicative of other user personally identifying information; and one or more utterances indicative of other authentication indicia; initiating, via said Voice over Internet Protocol, said second communication with said second telephone system; and causing said second telephone system to initiate a second interactive voice response protocol based upon at least one of said intent of said second communication, said other user personally identifying information, and said other authentication indicia.

According to a fifth embodiment, an apparatus is provided that comprises at least one processor and at least one memory including computer program instructions. In some embodiments, said at least one processor can be configured, with said at least one memory including computer program instructions, at least to: receive, at a smart device, a first verbal instruction to initiate a first communication with a first telephone system, one or more utterances indicative of an intent of said first communication, one or more utterances indicative of user personally identifying information; and one or more utterances indicative of authentication indicia; initiate, for instance using voice-over-internet protocol (VoIP), said first communication with said first telephone system; cause said first telephone system to initiate a first interactive voice response protocol based upon at least one of said intent of said first communication, said user personally identifying information, and said authentication indicia; receive, at said smart device, a second verbal instruction to initiate a second communication with a second telephone system, one or more utterances indicative of other user personally identifying information; and one or more utterances indicative of other authentication indicia; initiate, via said Voice over Internet Protocol, said second communication with said second telephone system; and cause said second telephone system to initiate a second interactive voice response protocol based upon at least one of said intent of said second communication, said other user personally identifying information, and said other authentication indicia.

According to a sixth embodiment, at least one non-transitory computer readable medium is provided that comprises instructions that, when executed, cause a computing device to perform at least the following: receive, at a smart device, a first verbal instruction to initiate a first communication with a first telephone system, one or more utterances indicative of an intent of said first communication, one or more utterances indicative of user personally identifying information; and one or more utterances indicative of authentication indicia; initiate, for instance using voice-over-internet protocol (VoIP), said first communication with said first telephone system; cause said first telephone system to initiate a first interactive voice response protocol based upon at least one of said intent of said first communication, said user personally identifying information, and said authentication indicia; receive, at said smart device, a second verbal instruction to initiate a second communication with a second telephone system, one or more utterances indicative of other user personally identifying information; and one or more utterances indicative of other authentication indicia; initiate, via said Voice over Internet Protocol, said second communication with said second telephone system; and cause said second telephone system to initiate a second interactive voice response protocol based upon at least one of said intent of said second communication, said other user personally identifying information, and said other authentication indicia.

According to a seventh embodiment, a method can be provided for aggregating user sessions for conversational exchanges using a virtual assistant, the method comprising: receiving, at a user device, a plurality of conversational inputs; converting the plurality of conversational inputs into a plurality of textual strings; associating, based upon semantic analysis of a first portion of said plurality of textual strings, a first network; associating, based upon semantic analysis of a second portion of said plurality of conversational inputs, a second network; initiating a first user session with a first response module of the first network; initiating a second user session with a second response module of the second network; sending the first portion of the plurality of textual strings, within the first user session, to the first response module of the first network; sending the second portion of the plurality of textual strings, within the second user session, to the second response module of the second network; receiving, from the first response module of said first network, a response fragment comprising a response to said first portion of said plurality of textual strings; receiving, from the second response module of said second network, a second response fragment comprising a response to said second portion of said plurality of textual strings; and combining the first and second response fragments in a semantically suitable order to form a generated response.

In some embodiments, said combining the first and second response fragments in a semantically suitable order can comprise combining the first and second response fragments by subject matter, by associated network, by chronology, or by determined relative urgency of the respective response fragment. In some embodiments, the first and second response fragments comprise textual information. In some embodiments, the method can further comprise converting the first and second response fragments into a plurality of conversational outputs; and causing auditory presentation of the generated response by the user device. In some embodiments, the method can further comprise determining, from one or more of the plurality of textual strings, to initiate the first user session with the first response module of the first network and/or to initiate the second user session with the second response module of the second network. In some embodiments, the first response module and/or the second response module comprises a chatbot and the first network and/or the second network comprises a server operated by one or more providers. In some embodiments, the method can further comprise determining, from one or more of the plurality of textual strings, an intent of one or more conversational inputs from the plurality of conversation inputs, one or more pieces of personally identifying information, and/or one or more authentication indicia. In some embodiments, said first response module and/or said second response module can comprise a chatbot and the first network and/or the second network comprises one or more interactive voice response (IVR) systems operated by one or more providers. In some embodiments, the method can further comprise initiating, based upon at least the intent, the one or more pieces of personally identifying information, and/or the one or more authentication indicia, a first IVR protocol comprising: providing, in the first user session, for communication between the user and the first response module; and determining, based at least upon the intent of said one or more of the plurality of textual strings, to establish the second user session for communication between the user and the second response module. In some embodiments, the method can further comprise determining, based on semantic analysis of a third portion of said plurality of textual strings, to: disconnect one or more of the first user session and the second user session; and, after a predetermined time, establish one or more other user sessions between a mobile device of the user and one or more of the first response module and the second response module.

According to an eighth embodiment, a non-transitory computer readable medium can be provided that comprises instructions that, when executed, cause a computing device to perform at least the following: receive, at a user device, a plurality of conversational inputs; convert the plurality of conversational inputs into a plurality of textual strings; associate, based upon semantic analysis of a first portion of said plurality of textual strings, a first network; associate, based upon semantic analysis of a second portion of said plurality of conversational inputs, a second network; initiate a first user session with a first response module of the first network; initiate a second user session with a second response module of the second network; send the first portion of the plurality of textual strings, within the first user session, to the first response module of the first network; send the second portion of the plurality of textual strings, within the second user session, to the second response module of the second network; receive, from the first response module of said first network, a response fragment comprising a response to said first portion of said plurality of textual strings; receive, from the second response module of said second network, a second response fragment comprising a response to said second portion of said plurality of textual strings; and combine the first and second response fragments in a semantically suitable order to form a generated response.

In some embodiments, said combining the first and second response fragments in a semantically suitable order can comprise combining the first and second response fragments by subject matter, by associated network, by chronology, or by determined relative urgency of the respective response fragment. In some embodiments, the first and second response fragments comprise textual information. In some embodiments, the non-transitory computer readable medium can further comprise instructions that, when executed, cause the computing device to perform at least the following: convert the first and second response fragments into a plurality of conversational outputs; and cause auditory presentation of the generated response by the user device. In some embodiments, the non-transitory computer readable medium can further comprise instructions that, when executed, cause the computing device to perform at least the following: determine, from one or more of the plurality of textual strings, to initiate the first user session with the first response module of the first network and/or to initiate the second user session with the second response module of the second network. In some embodiments, the non-transitory computer readable medium can further comprise instructions that, when executed, cause the computing device to perform at least the following: determine, from one or more of the plurality of textual strings, an intent of one or more conversational inputs from the plurality of conversation inputs, one or more pieces of personally identifying information, and/or one or more authentication indicia. In some embodiments, the first response module and/or the second response module comprises a chatbot and the first network and/or the second network comprises one or more servers operated or one or more interactive voice response (IVR) systems operated by one or more providers. In some embodiments, the non-transitory computer readable medium can further comprise instructions that, when executed, cause the computing device to perform at least the following: initiate, based upon at least the intent, the one or more pieces of personally identifying information, and/or the one or more authentication indicia, a first IVR protocol comprising: providing, in the first user session, for communication between the user and the first response module; and determining, based at least upon the intent of said one or more of the plurality of textual strings, to establish the second user session for communication between the user and the second response module. In some embodiments, the non-transitory computer readable medium can further comprise instructions that, when executed, cause the computing device to perform at least the following: determine, based on semantic analysis of a third portion of said plurality of textual strings, to: disconnect one or more of the first user session and the second user session; and, after a predetermined time, establish one or more other user sessions between a mobile device of the user and one or more of the first response module and the second response module.

According to a ninth embodiment, an apparatus can be provided that comprises one or more processors and one or more memory devices storing computer instructions, the one or more memory devices storing computer program code being configured to, with the one or more processors, at least the following: receive, at a user device, a plurality of conversational inputs; convert the plurality of conversational inputs into a plurality of textual strings; associate, based upon semantic analysis of a first portion of said plurality of textual strings, a first network; associate, based upon semantic analysis of a second portion of said plurality of conversational inputs, a second network; initiate a first user session with a first response module of the first network; initiate a second user session with a second response module of the second network; send the first portion of the plurality of textual strings, within the first user session, to the first response module of the first network; send the second portion of the plurality of textual strings, within the second user session, to the second response module of the second network; receive, from the first response module of said first network, a response fragment comprising a response to said first portion of said plurality of textual strings; receive, from the second response module of said second network, a second response fragment comprising a response to said second portion of said plurality of textual strings; and combine the first and second response fragments in a semantically suitable order to form a generated response.

In some embodiments, said combining the first and second response fragments in a semantically suitable order can comprise combining the first and second response fragments by subject matter, by associated network, by chronology, or by determined relative urgency of the respective response fragment. In some embodiments, the first and second response fragments comprise textual information. In some embodiments, the one or more memory devices storing computer program code can be further configured to, with the one or more apparatuses, cause the apparatus to at least: convert the first and second response fragments into a plurality of conversational outputs; and cause auditory presentation of the generated response by the user device. In some embodiments, the one or more memory devices storing computer program code can be further configured to, with the one or more apparatuses, cause the apparatus to at least: determine, from one or more of the plurality of textual strings, to initiate the first user session with the first response module of the first network and/or to initiate the second user session with the second response module of the second network. In some embodiments, the one or more memory devices storing computer program code can be further configured to, with the one or more apparatuses, cause the apparatus to at least: determine, from one or more of the plurality of textual strings, an intent of one or more conversational inputs from the plurality of conversation inputs, one or more pieces of personally identifying information, and/or one or more authentication indicia. In some embodiments, the first response module and/or the second response module comprises a chatbot and the first network and/or the second network comprises one or more servers operated or one or more interactive voice response (IVR) systems operated by one or more providers. In some embodiments, the one or more memory devices storing computer program code can be further configured to, with the one or more apparatuses, cause the apparatus to at least: initiate, based upon at least the intent, the one or more pieces of personally identifying information, and/or the one or more authentication indicia, a first IVR protocol comprising: providing, in the first user session, for communication between the user and the first response module; and determining, based at least upon the intent of said one or more of the plurality of textual strings, to establish the second user session for communication between the user and the second response module. In some embodiments, the one or more memory devices storing computer program code can be further configured to, with the one or more apparatuses, cause the apparatus to at least: determine, based on semantic analysis of a third portion of said plurality of textual strings, to: disconnect one or more of the first user session and the second user session; and, after a predetermined time, establish one or more other user sessions between a mobile device of the user and one or more of the first response module and the second response module.

According to a tenth embodiment, a method is provided for providing information to a user from multiple providers and/or regarding multiple accounts. In some embodiments, the method can comprise: establishing communication with a plurality of information sources, the plurality of information sources being associated with a user; receiving information from a first information source indicative of a first account or a first provider; receiving additional information from a second information source indicative of a second account or a second provider; storing the information and additional information in a database or index associated with the user; receiving a request for information associated with the first account or the first provider; receiving another request for information associated with the second account or the second provider; preparing a first response portion based upon the information from the first information source; preparing a second response portion based upon the additional information from the second information source; and combining the first and second response portions in a semantically suitable order to form a compiled response.

According to an eleventh embodiment, a non-transitory computer readable medium can be provided that comprises instructions that, when executed, cause a computing device to provide information to a user device from multiple providers and/or regarding multiple accounts. In some embodiments, the non-transitory computer readable medium can comprise instructions that, when executed, cause a computing device to at least: establish communications with a plurality of information sources, the plurality of information sources being associated with a user; receive information from a first information source indicative of a first account or a first provider; receive additional information from a second information source indicative of a second account or a second provider; store the information and additional information in a database or index associated with the user; receive a request for information associated with the first account or the first provider; receive another request for information associated with the second account or the second provider; prepare a first response portion based upon the information from the first information source; prepare a second response portion based upon the additional information from the second information source; and combine the first and second response portions in a semantically suitable order to form a compiled response.

According to a twelfth embodiment, an apparatus can be provided for providing information to a user device from multiple providers and/or regarding multiple accounts. In some embodiments, the apparatus can comprise one or more processors and one or more memory devices storing computer instructions, the one or more memory devices storing computer program code being configured to, with the one or more processors, at least the following: establish communications with a plurality of information sources, the plurality of information sources being associated with a user; receive information from a first information source indicative of a first account or a first provider; receive additional information from a second information source indicative of a second account or a second provider; store the information and additional information in a database or index associated with the user; receive a request for information associated with the first account or the first provider; receive another request for information associated with the second account or the second provider; prepare a first response portion based upon the information from the first information source; prepare a second response portion based upon the additional information from the second information source; and combine the first and second response portions in a semantically suitable order to form a compiled response.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed, and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

To provide an overall understanding, certain illustrative embodiments have been described; however, it will be understood by one of ordinary skill in the art that systems, apparatuses, and methods described herein can be adapted and modified to provide systems, apparatuses, and methods for other suitable applications and that other additions and modifications can be made without departing from the scope of systems, apparatuses, and methods described herein.

The embodiments described herein have been particularly shown and described, but it will be understood that various changes in form and details may be made. Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the scope of the disclosed and exemplary systems, apparatuses, or methods of the present disclosure.

Conventional terms in the fields of telecommunications, IoT devices, payment servicing, artificial intelligence, and machine learning have been used herein. The terms are known in the art and are provided only as a non-limiting example for convenience purposes. Accordingly, the interpretation of the corresponding terms in the claims, unless stated otherwise, is not limited to any particular definition. Thus, the terms used in the claims should be given their broadest reasonable interpretation.

Although specific embodiments have been illustrated and described herein, it will be appreciated by those of ordinary skill in the art that any arrangement that is adapted to achieve the same purpose may be substituted for the specific embodiments shown. Many adaptations will be apparent to those of ordinary skill in the art. Accordingly, this application is intended to cover any adaptations or variations.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," and/or the like are used merely as labels, and are not intended to impose numerical requirements or any relative order of operations or organization on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure and is submitted with the understanding that it will not be used to interpret or limit the scope or meaning of the claims.

In this Detailed Description, various features may have been grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments may be combined with each other in various combinations or permutations. The scope of the embodiments should be determined with reference to the appended claims, along with the full scope of equivalents to which such claims are entitled.

What is claimed is:

1. An apparatus comprising:
   at least one processor; and
   at least one memory storing instructions thereon that, when executed by the at least one processor, cause the apparatus to perform at least:
   receiving or sensing one or more user inputs associated with a user;
   determining, based upon the one or more user inputs, that the user is requesting to initiate a transaction between the user and a merchant or a biller;
   initiating a first user session with a merchant device associated with the merchant or a biller device associated with the biller;
   initiating a second user session with a database storing user account information and payment information;
   receiving, from the database, during the second user session, information about one or more user accounts;
   determining, based at least upon the information about the one or more user accounts received from the database during the second user session, whether the merchant or the biller is affiliated with at least one of the one or more user accounts;
   in an instance in which the merchant or the biller is affiliated with at least one of the one or more user accounts, initiating the transaction between the user and the merchant or the biller, during the first user session, by sending a transaction request towards a payment processor, the transaction request being associated with the transaction between the user and the merchant or the biller.

2. A method comprising:
   receiving or sensing one or more user inputs associated with a user;
   determining, based upon the one or more user inputs, that the user is requesting to initiate a transaction between the user and a merchant or a biller;
   initiating a first user session with a merchant device associated with the merchant or a biller device associated with the biller;
   initiating a second user session with a database storing user account information and payment information;
   receiving, from the database, during the second user session, information about one or more user accounts;
   determining, based at least upon the information about the one or more user accounts received from the database during the second user session, whether the merchant or the biller is affiliated with at least one of the one or more user accounts;
   in an instance in which the merchant or the biller is affiliated with at least one of the one or more user accounts, initiating the transaction between the user and the merchant or the biller, during the first user session, by sending a transaction request towards a payment processor, the transaction request being associated with the transaction between the user and the merchant or the biller.

3. A user device comprising:
   at least one processor; and
   at least one memory storing instructions thereon that, when executed by the at least one processor, cause the user device to perform at least:
   receiving a plurality of textual strings associated with a plurality of conversational inputs;
   conducting a semantic analysis of the plurality of textual strings to determine at least a first portion of the plurality of textual strings;
   determining the first portion of the plurality of textual strings are associated with a first network;
   initiating a first user session with a first response module of the first network;
   sending, based on the first portion of the plurality of textual strings, a request for information to the first network; and
   receiving, from the first response module of the first network, a first response fragment comprising a response to the request for information.

4. The user device of claim 3, wherein the instructions stored on the at least one memory, when executed by the at least one processor, further cause the user device to perform at least:
   receiving or sensing one or more user inputs associated with a user;
   determining, based upon the one or more user inputs, that the user is requesting to initiate a transaction between the user and a merchant or a biller;
   initiating a first user session with a merchant device associated with the merchant or a biller device associated with the biller;
   initiating a second user session with a database storing user account information and payment information;
   receiving from the database, during the second user session, information about one or more user accounts; and
   initiating the transaction between the user and the merchant or the biller, during the first user session, based upon the information about the one or more user accounts received from the database during the second user session.

5. The user device of claim 3, wherein the instructions stored on the at least one memory, when executed by the at least one processor, further cause the user device to perform at least:
   determining, based upon the information about the one or more user accounts received from the database during the second user session, the merchant or the biller is affiliated with at least one of the one or more user accounts; and
   if the merchant or the biller is affiliated with at least one of the one or more user accounts, initiating the transaction between the user and the merchant or the biller by sending a transaction request to a payment processor.

6. The user device of claim 3, wherein the instructions stored on the at least one memory, when executed by the at least one processor, further cause the user device to perform at least:
   identifying, based on a response fragment from the first network, a second portion of the plurality of textual strings, and/or input from a user, a second network associated;
   initiating a second user session with a second response module of the second network;
   sending, based on based on a response fragment from the first network, a second portion of the plurality of textual strings, and/or input from the user, a request for information to the second network;
   receiving from the second response module of the second network, a second response fragment comprising a response to the request for information; and
   combining the first and second response fragments in a semantically suitable order to form a generated response.

7. The user device of claim 6, wherein the instructions stored on the at least one memory, when executed by the at least one processor, further cause the user device to perform at least:
   combining the first and second response fragments in a semantically suitable order to form a generated response;
   determining, based upon a semantic analysis of the first or the second response fragments, the plurality of textual strings, and/or input from the user, a second user device to which the generated response should be sent; and
   sending the generated response to the second user device.

8. The user device of claim 7, wherein the instructions stored on the at least one memory, when executed by the at least one processor, further cause the user device to perform at least:
   combining the first and second response fragments in a semantically suitable order to form a generated response;
   determining, based upon a semantic analysis of the first or the second response fragments, the plurality of textual strings, and/or input from the user, a second user device that should be in communication with the first network; and
   facilitating communication between the second user device and the first network.

9. A method comprising:
   receiving, at a user device, a plurality of textual strings associated with a plurality of conversational inputs;
   conducting a semantic analysis of the plurality of textual strings to determine at least a first portion of the plurality of textual strings;
   determining the first portion of the plurality of textual strings are associated with a first network;
   initiating a first user session with a first response module of the first network;
   sending, based on the first portion of the plurality of textual strings, a request for information to the first network; and
   receiving, from the first response module of the first network, a first response fragment comprising a response to the request for information.

10. The method of claim 9, further comprising:
    identifying, based on a response fragment from the first network, a second portion of the plurality of textual strings, and/or input from a user, a second network associated;
    initiating a second user session with a second response module of the second network;
    sending, based on based on a response fragment from the first network, a second portion of the plurality of textual strings, and/or input from the user, a request for information towards the second network;
    receiving, from the second response module of the second network, a second response fragment comprising a response to the request for information; and
    combining the first and second response fragments in a semantically suitable order to form a generated response.

11. The method of claim 9, further comprising:
    combining the first and second response fragments in a semantically suitable order to form a generated response;
    determining, based upon a semantic analysis of the first or the second response fragments, the plurality of textual strings, and/or input from the user, a second user device to which the generated response should be sent; and
    sending the generated response towards the second user device.

12. The method of claim 9, further comprising:
    combining the first and second response fragments in a semantically suitable order to form a generated response;
    determining, based upon a semantic analysis of the first or the second response fragments, the plurality of textual strings, and/or input from the user, a second user device that should be in communication with the first network; and
    facilitating communication between the second user device and the first network.

13. A user device comprising:
    at least one processor; and
    at least one memory storing instructions thereon that, when executed by the at least one processor, cause the user device to perform at least:
    receiving a plurality of conversational inputs;
    converting the plurality of conversational inputs into a plurality of textual strings;
    associating, based upon semantic analysis of a first portion of the plurality of textual strings, the first portion of the plurality of textual strings with a first network;
    associating, based upon semantic analysis of a second portion of the plurality of textual strings, the second portion of the plurality of textual strings with a second network;

initiating a first user session with a first response module of the first network; and initiating a second user session with a second response module of the second network.

14. The user device of claim 13, wherein the instructions stored on the at least one memory, when executed by the at least one processor, further cause the user device to perform at least:

determining information associated with the first or second user sessions is to be forwarded to a second user device;

in an instance in which the information associated with the first or second user sessions is to be forwarded to the second user device, forwarding the information associated with one or more of the first or second user sessions towards the second user device; and managing communications between one or more of the first or second user sessions and the second user device through one or more of functions comprising one or more of adding, dropping, silencing, placing on hold, or forwarding.

15. The apparatus of claim 14, wherein the instructions stored on the at least one memory, when executed by the at least one processor, further cause the apparatus to perform at least:

handing off control of one or more of the first or second user session to the second user device.

16. A method comprising:

receiving, at a user device, a plurality of conversational inputs;

converting the plurality of conversational inputs into a plurality of textual strings;

associating, based upon semantic analysis of a first portion of the plurality of textual strings, the first portion of the plurality of textual strings with a first network;

associating, based upon semantic analysis of a second portion of the plurality of textual strings, the second portion of the plurality of textual strings with a second network;

initiating a first user session with a first response module of the first network; and initiating a second user session with a second response module of the second network.

17. The method of claim 16, further comprising:

determining that information associated with one or more of the first or second user session is to be forwarded towards a second user device;

in an instance in which the information associated with one or more of the first or second user session is to be forwarded towards the second user device, forwarding the information associated with one or more of the first or second user session towards the second user device; and managing communications between one or more of the first or second user sessions and the second user device through one or more of functions comprising one or more of: adding, dropping, silencing, placing on hold, or forwarding.

18. The method of claim 17, further comprising:

handing off control of one or more of the first or second user session to the second user device.

* * * * *

UNITED STATES PATENT AND TRADEMARK OFFICE
CERTIFICATE OF CORRECTION

PATENT NO. : 11,991,126 B2
APPLICATION NO. : 17/869605
DATED : May 21, 2024
INVENTOR(S) : Dushyant Sharma Page 1 of 1

It is certified that error appears in the above-identified patent and that said Letters Patent is hereby corrected as shown below:

In the Claims

In Column 42, Line 63, Claim 4, delete "receiving" and insert -- receiving, --, therefor.
In Column 43, Line 29, Claim 6, delete "based on based on a" and insert -- based on a --, therefor.
In Column 43, Line 33, Claim 6, delete "receiving" and insert -- receiving, --, therefor.
In Column 44, Line 21, Claim 10, delete "based on based on a" and insert -- based on a --, therefor.
In Column 45, Line 22, Claim 15, delete "apparatus" and insert -- user device --, therefor.

Signed and Sealed this
Twenty-fourth Day of September, 2024

Katherine Kelly Vidal
*Director of the United States Patent and Trademark Office*